United States Patent
Lemberger

(10) Patent No.: US 11,153,538 B1
(45) Date of Patent: Oct. 19, 2021

(54) MODIFYING AUDIO/VIDEO RECORDING AND COMMUNICATION DEVICE SETTINGS IN RESPONSE TO APPLICATION ACCESS

(71) Applicant: AMAZON TECHNOLOGIES, INC., Seattle, WA (US)

(72) Inventor: Elliott Lemberger, Santa Monica, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/364,103

(22) Filed: Mar. 25, 2019

Related U.S. Application Data

(60) Provisional application No. 62/650,186, filed on Mar. 29, 2018.

(51) Int. Cl.
*H04N 7/18* (2006.01)
*H04N 5/232* (2006.01)

(52) U.S. Cl.
CPC ......... *H04N 7/186* (2013.01); *H04N 5/23206* (2013.01)

(58) Field of Classification Search
CPC ............................ H04N 7/186; H04N 5/23206
USPC .......................................................... 348/143
See application file for complete search history.

(56) References Cited

U.S. PATENT DOCUMENTS

| | | |
|---|---|---|
| 4,764,953 A | 8/1988 | Chern et al. |
| 5,428,388 A | 6/1995 | Von Bauer et al. |
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 6/2006 | Lee |
| 7,109,860 B2 | 9/2006 | Wang |
| 7,193,644 B2 | 3/2007 | Carter |

(Continued)

FOREIGN PATENT DOCUMENTS

| CN | 2585521 Y | 11/2003 |
|---|---|---|
| CN | 2792061 Y | 6/2006 |

(Continued)

*Primary Examiner* — On S Mung
(74) *Attorney, Agent, or Firm* — Lathrop GPM LLP

(57) ABSTRACT

Methods communicate among a client device, a network device, and an audio/video recording and communication device (A/V device). The network device includes a processor, memory, and instructions that when executed by the processor implement the method. An indication that an application associated with the A/V device is running and open on a display of the client device is received from the client device. Update information, when received by the A/V device, causes the A/V device to adjust a keep-alive interval from a first amount of time to a second amount of time shorter than the first amount of time. A signal from the A/V device is received, and the update information is transmitted to the A/V device in response.

23 Claims, 18 Drawing Sheets

(56) References Cited

U.S. PATENT DOCUMENTS

| | | |
|---|---|---|
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2002/0094111 A1 | 7/2002 | Puchek et al. |
| 2002/0147982 A1* | 10/2002 | Naidoo ............ G08B 13/19645 725/105 |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2013/0057695 A1 | 3/2013 | Huisking |
| 2015/0035987 A1 | 2/2015 | Fernandez |

FOREIGN PATENT DOCUMENTS

| | | |
|---|---|---|
| EP | 0944883 B1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A2 | 4/2001 |
| JP | 2002-033839 A2 | 1/2002 |
| JP | 2002-125059 A2 | 4/2002 |
| JP | 2002-342863 A2 | 11/2002 |
| JP | 2002-344640 A2 | 11/2002 |
| JP | 2002-354137 A2 | 12/2002 |
| JP | 2002-368890 A2 | 12/2002 |
| JP | 2003-283696 A2 | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 09-008925 A | 1/2009 |
| WO | WO 199839894 A1 | 9/1998 |
| WO | WO 0113638 A1 | 2/2001 |
| WO | WO 200193220 A1 | 12/2001 |
| WO | WO 2002085019 A1 | 10/2002 |
| WO | WO 2003028375 A1 | 4/2003 |
| WO | WO 2003096696 A1 | 11/2003 |
| WO | WO 2006038760 A1 | 4/2006 |
| WO | WO 2006067782 A1 | 6/2006 |
| WO | WO 2007125143 A1 | 8/2007 |

\* cited by examiner

MODIFYING AUDIO/VIDEO RECORDING AND COMMUNICATION DEVICE SETTINGS IN RESPONSE TO APPLICATION ACCESS

RELATED APPLICATION

This application claims priority to U.S. Provisional Patent Application Ser. No. 62/650,186, filed on Mar. 29, 2018, which is incorporated herein by reference in its entirety.

TECHNICAL FIELD

The present embodiments relate to audio/video (A/V) recording and communication devices, including A/V recording and communication doorbells, security cameras, and floodlight controllers. In particular, the present embodiments relate to improvements in the functionality of A/V recording and communication devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. A/V recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various embodiments of the present modifying A/V recording and communication device settings in response to application access now will be discussed in detail with an emphasis on highlighting the advantageous features. These embodiments depict the novel and non-obvious modifying of A/V recording and communication device settings in response to application access shown in the accompanying drawings, which are for illustrative purposes only. These drawings include the following figures, in which like numerals indicate like parts.

DETAILED DESCRIPTION

Figure 1:
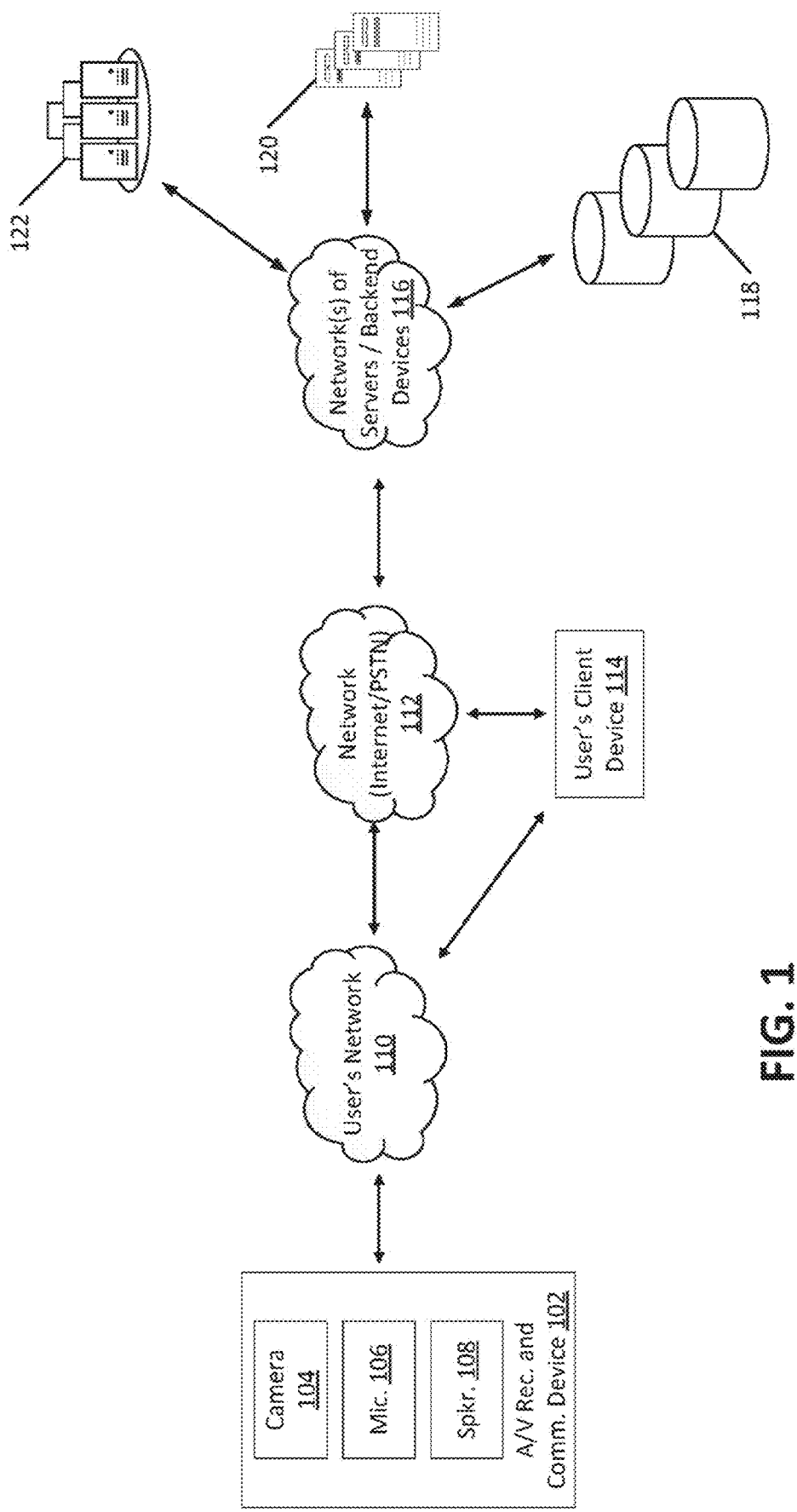
FIG. 1 is a functional block diagram illustrating a system for streaming and storing A/V content captured by an audio/video recording and communication device (A/V device) according to various aspects of the present disclosure.

The following detailed description describes the present embodiments with reference to the drawings. In the drawings, reference numbers label elements of the present embodiments. These reference numbers are reproduced below in connection with the discussion of the corresponding drawing features.

The various embodiments of the present systems and methods for modifying A/V recording and communication device settings in response to application access have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments enables a user to interact with an A/V recording and communication device through an application running on a client device. These interactions may include, among other things described in the present disclosure, obtaining A/V data from the A/V recording and communication device (e.g., video captured by the device). In some instances, the user may experience latency when receiving the A/V data, for example, as a result of a low power state of the A/V recording and communication device. The present embodiments solve this problem by modifying a setting of the A/V recording and communication device in response to user interaction with the application. For example, when the user opens the application on the client device, or opens a particular menu or screen of the application, a server may detect the user interaction and cause the A/V recording and communication device to reduce an interval of the low power state based at least in part on a likelihood of the user requesting A/V data through the application or the particular menu or screen of the application. The present embodiments thus reduce latency when the user requests A/V data by anticipating when the user is likely to request A/V data and, in response, readying the A/V recording and communication device to provide the A/V data if and when the user requests it.

With reference to FIG. 1, the present embodiments include an audio/video (A/V) recording and communication device (A/V device) 102. While the present disclosure provides numerous examples of methods and systems including A/V recording and communication doorbells (A/V doorbells), the present embodiments are equally applicable for A/V devices other than doorbells. For example, the present embodiments may include one or more A/V recording and communication security cameras (A/V security cameras) instead of, or in addition to, one or more A/V doorbells. An example A/V security camera may include substantially all of the structure and/or functionality of the doorbells described herein, but without the front button and related components. In another example, the present embodiments may include one or more A/V recording and communication floodlight controllers (A/V floodlight controllers) instead of, or in addition to, one or more A/V doorbells.

The A/V device 102 may be located near the entrance to a structure (not shown), such as a dwelling, a business, a storage facility, etc. The A/V device 102 includes a camera 104, a microphone 106, and a speaker 108. The camera 104 may comprise, for example, a high definition (HD) video camera, such as one capable of capturing video images at an image display resolution of 722p, or 1080p, 4K, or any other image display resolution. While not shown, the A/V device 102 may also include other hardware and/or components, such as a housing, a communication module (which may facilitate wired and/or wireless communication with other devices), one or more motion sensors (and/or other types of sensors), a button, etc. The A/V device 102 may further include similar componentry and/or functionality as the wireless communication doorbells described in U.S. Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V device 102 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V device 102 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone.

The A/V device 102 may also communicate, via the user's network 110 and the network 112 (Internet/PSTN), with a network(s) 116 of servers and/or backend devices, such as (but not limited to) one or more remote storage devices 118 (may be referred to interchangeably as "cloud storage device(s)"), one or more servers 120, and one or more APIs 122. While FIG. 1 illustrates the storage device 118, the server 120, and the API 122 as components separate from the network 116, it is to be understood that the storage device 118, the server 120, and/or the API 122 may be considered to be components of the network 116.

The network 116 may be any wireless network or any wired network, or a combination thereof, configured to operatively couple the above-mentioned modules, devices, and systems as shown in FIG. 1. For example, the network 116 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V device 102, the A/V device 102 detects the visitor's presence and begins capturing video images within a field of view of the camera 104. The A/V communication device 102 may also capture audio through the microphone 106. The A/V device 102 may detect the visitor's presence by detecting motion using the camera 104 and/or a motion sensor, and/or by detecting that the visitor has pressed a front button of the A/V device 102 (if the A/V device 102 is a doorbell).

In response to the detection of the visitor, the A/V device 102 sends an alert to the user's client device 114 (FIG. 1) via the user's network 110 and the network 112. The A/V device 102 also sends streaming video, and may also send streaming audio, to the user's client device 114. If the user answers the alert, two-way audio communication may then occur between the visitor and the user through the A/V device 102 and the user's client device 114. The user may view the visitor throughout the duration of the call, but the visitor cannot see the user (unless the A/V device 102 includes a display, which it may in some embodiments).

The video images captured by the camera 104 of the A/V device 102 (and the audio captured by the microphone 106) may be uploaded to the cloud and recorded on the remote storage device 118 (FIG. 1). In some embodiments, the video and/or audio may be recorded on the remote storage device 118 even if the user chooses to ignore the alert sent to his or her client device 114.

With further reference to FIG. 1, the system may further comprise an API 122 including one or more components. An API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. An API may, for example, comprise many such applications, each of which communicate with one another using their public APIs. In some embodiments, the API may hold the bulk of the user data and offer the user management capabilities, leaving the clients to have very limited state.

The API 122 illustrated in FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The API 122 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
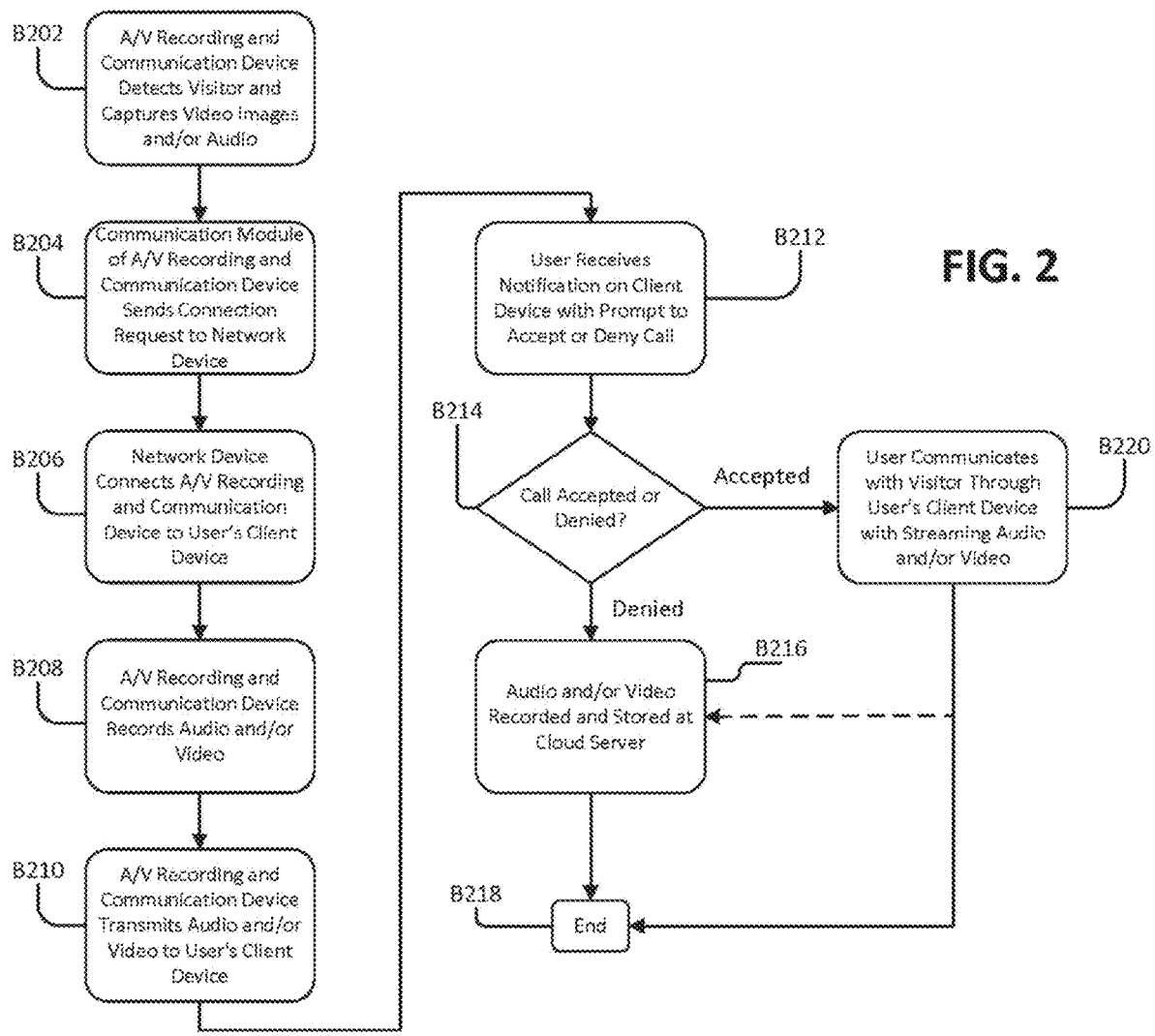
FIG. 2 is a flowchart illustrating a process for streaming and storing A/V content from an A/V device according to various aspects of the present disclosure.

FIG. 2 is a flowchart illustrating a process for streaming and storing A/V content from the A/V device 102 according to various aspects of the present disclosure. At block B202, the A/V device 102 detects the visitor's presence and captures video images within a field of view of the camera 104. The A/V device 102 may also capture audio through the microphone 106. As described above, the A/V device 102 may detect the visitor's presence by detecting motion using the camera 104 and/or a motion sensor, and/or by detecting that the visitor has pressed a front button of the A/V device 102 (if the A/V device 102 is a doorbell). Also, as described above, the video recording/capture may begin when the visitor is detected, or may begin earlier, as described below.

At block B204, a communication module of the A/V device 102 sends a connection request, via the user's network 110 and the network 112, to a device in the network 112. For example, the network device to which the request is sent may be a server such as the server 120. The server 120 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the API 122, which is described above.

In response to the request, at block B206 the network device may connect the A/V device 102 to the user's client device 114 through the user's network 110 and the network 112. At block B208, the A/V device 102 may record available audio and/or video data using the camera 104, the microphone 106, and/or any other device/sensor available. At block B210, the audio and/or video data is transmitted (streamed) from the A/V device 102 to the user's client device 114 via the user's network 110 and the network 112. At block B212, the user may receive a notification on his or her client device 114 with a prompt to either accept or deny the call.

At block B214, the process determines whether the user has accepted or denied the call. If the user denies the notification, then the process advances to block B216, where the audio and/or video data is recorded and stored at a cloud server. The session then ends at block B218 and the connection between the A/V device 102 and the user's client device 114 is terminated. If, however, the user accepts the notification, then at block B220 the user communicates with the visitor through the user's client device 114 while audio and/or video data captured by the camera 104, the microphone 106, and/or other devices/sensors is streamed to the user's client device 114. At the end of the call, the user may terminate the connection between the user's client device 114 and the A/V device 102 and the session ends at block B220. In some embodiments, the audio and/or video data may be recorded and stored at a cloud server (block B216)

even if the user accepts the notification and communicates with the visitor through the user's client device 114.

Figure 3:
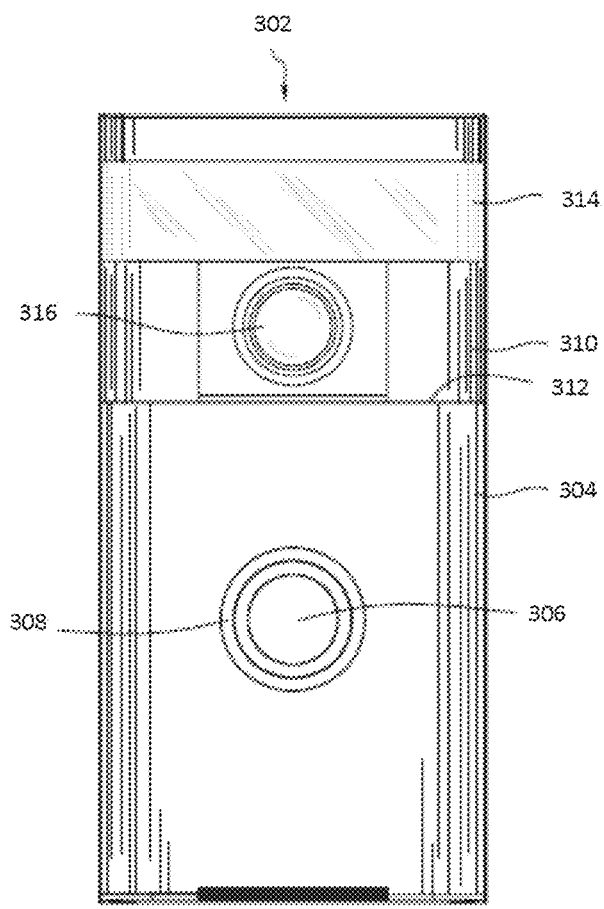
FIG. 3 is a front view of an A/V recording and communication doorbell (A/V doorbell) according to various aspects of the present disclosure.
Figure 4:
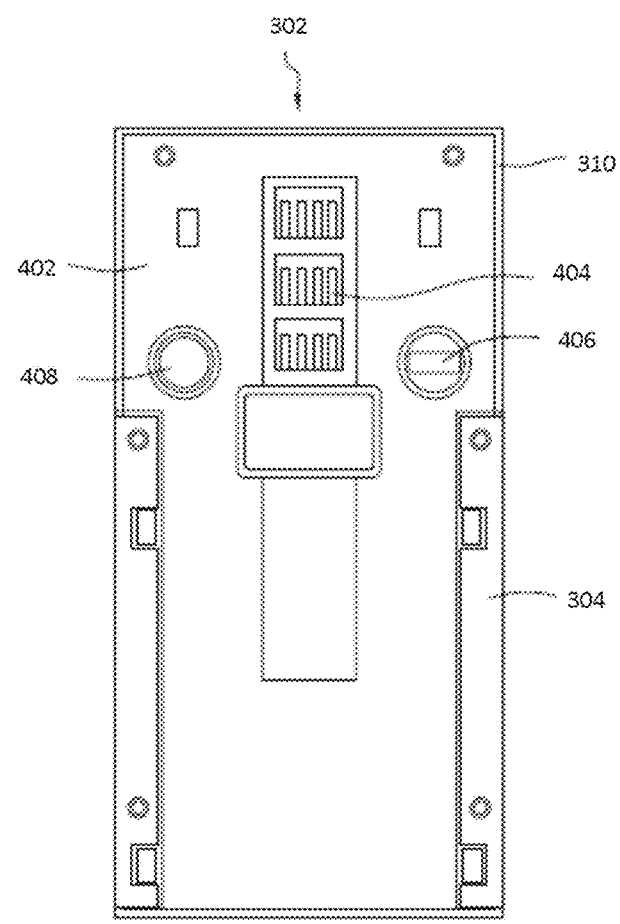
FIG. 4 is a rear view of the A/V doorbell of FIG. 3.
Figure 5:
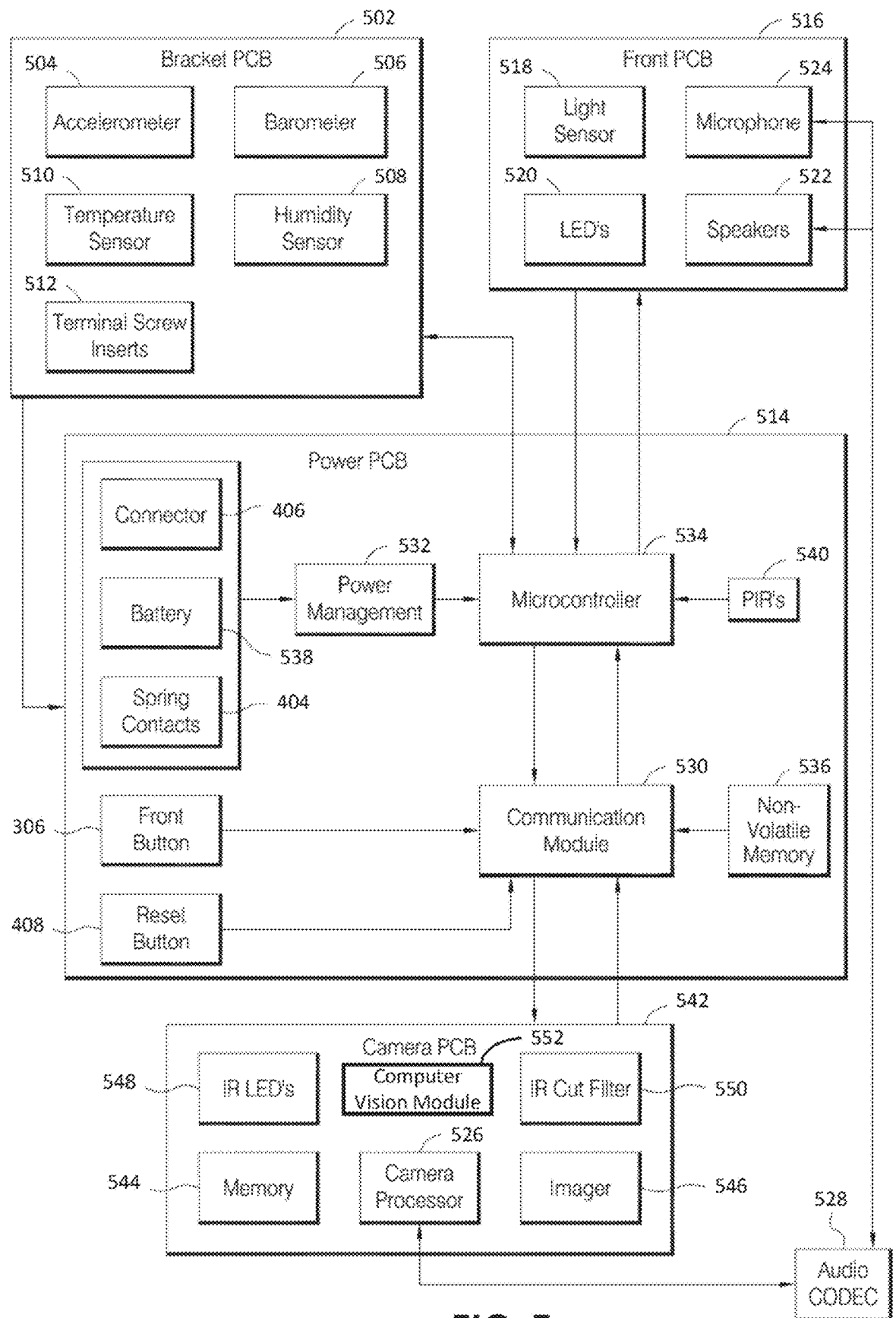
FIG. 5 is a functional block diagram of the components of the A/V doorbell of FIGS. 3 and 4.

FIGS. 3-5 illustrate an audio/video (A/V) communication doorbell 302 (also referred to a "doorbell 302") according to an aspect of present embodiments. FIG. 3 is a front view, FIG. 4 is a rear view, and FIG. 5 is a functional block diagram of the components within or in communication with the doorbell 302. With reference to FIG. 3, the doorbell 302 includes a faceplate 304 mounted to a back plate 402 (FIG. 4). The faceplate 304 may comprise any suitable material, including, without limitation, metals, such as brushed aluminum or stainless steel, metal alloys, or plastics. The faceplate 304 protects the internal contents of the doorbell 302 and serves as an exterior front surface of the doorbell 302.

With reference to FIG. 3, the faceplate 304 includes a button 306 and a light pipe 308. The button 306 and the light pipe 308 may have various profiles that may or may not match the profile of the faceplate 304. The light pipe 308 may comprise any suitable material, including, without limitation, transparent plastic, that is capable of allowing light produced within the doorbell 302 to pass through. The light may be produced by one or more light-emitting components, such as light-emitting diodes (LED's), contained within the doorbell 302, as further described below. The button 306 may make contact with a button actuator (not shown) located within the doorbell 302 when the button 306 is pressed by a visitor. When pressed, the button 306 may trigger one or more functions of the doorbell 302, as further described below.

With further reference to FIG. 3, the doorbell 302 further includes an enclosure 310 that engages the faceplate 304. In the illustrated embodiment, the enclosure 310 abuts an upper edge 312 of the faceplate 304, but in alternative embodiments one or more gaps between the enclosure 310 and the faceplate 304 may facilitate the passage of sound and/or light through the doorbell 302. The enclosure 310 may comprise any suitable material, but in some embodiments the material of the enclosure 310 preferably permits infrared light to pass through from inside the doorbell 302 to the environment and vice versa. The doorbell 302 further includes a lens 314. In some embodiments, the lens 314 may comprise a Fresnel lens, which may be patterned to deflect incoming light into one or more infrared sensors located within the doorbell 302. The doorbell 302 further includes a camera 316, which captures video data when activated, as described below.

FIG. 4 is a rear view of the doorbell 302, according to an aspect of the present embodiments. As illustrated, the enclosure 310 may extend from the front of the doorbell 302 around to the back thereof and may fit snugly around a lip of the back plate 402. The back plate 402 may comprise any suitable material, including, without limitation, metals, such as brushed aluminum or stainless steel, metal alloys, or plastics. The back plate 402 protects the internal contents of the doorbell 302 and serves as an exterior rear surface of the doorbell 302. The faceplate 304 may extend from the front of the doorbell 302 and at least partially wrap around the back plate 402, thereby allowing a coupled connection between the faceplate 304 and the back plate 402. The back plate 402 may have indentations in its structure to facilitate the coupling.

With further reference to FIG. 4, spring contacts 404 may provide power to the doorbell 302 when mated with other conductive contacts connected to a power source. The spring contacts 404 may comprise any suitable conductive material, including, without limitation, copper, and may be capable of deflecting when contacted by an inward force, for example the insertion of a mating element. The doorbell 302 further comprises a connector 406, such as a micro-USB or other connector, whereby power and/or data may be supplied to and from the components within the doorbell 302. A reset button 408 may be located on the back plate 402, and may make contact with a button actuator (not shown) located within the doorbell 302 when the reset button 408 is pressed. When the reset button 408 is pressed, it may trigger one or more functions, as described below.

FIG. 5 is a functional block diagram of the components within or in communication with the doorbell 302, according to an aspect of the present embodiments. A bracket PCB 502 may comprise an accelerometer 504, a barometer 506, a humidity sensor 508, and a temperature sensor 510. The accelerometer 504 may be one or more sensors capable of sensing motion and/or acceleration. The barometer 506 may be one or more sensors capable of determining the atmospheric pressure of the surrounding environment in which the bracket PCB 502 may be located. The humidity sensor 508 may be one or more sensors capable of determining the amount of moisture present in the atmospheric environment in which the bracket PCB 502 may be located. The temperature sensor 510 may be one or more sensors capable of determining the temperature of the ambient environment in which the bracket PCB 502 may be located. The bracket PCB 502 may be located outside the housing of the doorbell 302 so as to reduce interference from heat, pressure, moisture, and/or other stimuli generated by the internal components of the doorbell 302.

With further reference to FIG. 5, the bracket PCB 502 may further comprise terminal screw inserts 512, which may be configured to receive terminal screws (not shown) for transmitting power to electrical contacts on a mounting bracket (not shown). The bracket PCB 502 may be electrically and/or mechanically coupled to the power PCB 514 through the terminal screws, the terminal screw inserts 512, the spring contacts 404, and the electrical contacts. The terminal screws may receive electrical wires located at the surface to which the doorbell 302 is mounted, such as the wall of a building, so that the doorbell can receive electrical power from the building's electrical system. Upon the terminal screws being secured within the terminal screw inserts 512, power may be transferred to the bracket PCB 502, and to all of the components associated therewith, including the electrical contacts. The electrical contacts may transfer electrical power to the power PCB 514 by mating with the spring contacts 404.

With further reference to FIG. 5, the front PCB 516 may comprise a light sensor 518, one or more light-emitting components, such as LED's 520, one or more speakers 522, and a microphone 524. The light sensor 518 may be one or more sensors capable of detecting the level of ambient light of the surrounding environment in which the doorbell 302 may be located. LED's 520 may be one or more light-emitting diodes capable of producing visible light when supplied with power. The speakers 522 may be any electromechanical device capable of producing sound in response to an electrical signal input. The microphone 524 may be an acoustic-to-electric transducer or sensor capable of converting sound waves into an electrical signal. When activated, the LED's 520 may illuminate the light pipe 308 (FIG. 3). The front PCB 516 and all components thereof may be electrically coupled to the power PCB 514, thereby allowing data and/or power to be transferred to and from the power PCB 514 and the front PCB 516.

The speakers 522 and the microphone 524 may be coupled to the camera processor 526 through an audio CODEC 528. For example, the transfer of digital audio from the user's client device 114 and the speakers 522 and the microphone 524 may be compressed and decompressed using the audio CODEC 528, coupled to the camera processor 526. Once compressed by audio CODEC 528, digital audio data may be sent through the communication module 530 to the network 112, routed by the one or more servers 120, and delivered to the user's client device 114. When the user speaks, after being transferred through the network 112, digital audio data is decompressed by audio CODEC 528 and emitted to the visitor via the speakers 522.

With further reference to FIG. 5, the power PCB 514 may comprise a power management module 532, a microcontroller 534 (may also be referred to as "processor," "CPU," or "controller"), the communication module 530, and power PCB memory 536 (which may be volatile and/or non-volatile). In certain embodiments, the power management module 532 may comprise an integrated circuit capable of arbitrating between multiple voltage rails, thereby selecting the source of power for the doorbell 302. The battery 538, the spring contacts 404, and/or the connector 406 may each provide power to the power management module 532. The power management module 532 may have separate power rails dedicated to the battery 538, the spring contacts 404, and the connector 406. In one aspect of the present disclosure, the power management module 532 may continuously draw power from the battery 538 to power the doorbell 302, while at the same time routing power from the spring contacts 404 and/or the connector 406 to the battery 538, thereby allowing the battery 538 to maintain a substantially constant level of charge. Alternatively, the power management module 532 may continuously draw power from the spring contacts 404 and/or the connector 406 to power the doorbell 302, while only drawing from the battery 538 when the power from the spring contacts 404 and/or the connector 406 is low or insufficient. Still further, the battery 538 may comprise the sole source of power for the doorbell 302. In such embodiments, the spring contacts 404 may not be connected to a source of power. When the battery 538 is depleted of its charge, it may be recharged, such as by connecting a power source to the connector 406. The power management module 532 may also serve as a conduit for data between the connector 406 and the microcontroller 534.

With further reference to FIG. 5, in certain embodiments the microcontroller 534 may comprise an integrated circuit including a processor core, memory, and programmable input/output peripherals. The microcontroller 534 may receive input signals, such as data and/or power, from the PIR sensors 540, the bracket PCB 502, the power management module 532, the light sensor 518, the microphone 524, and/or the communication module 530, and may perform various functions as further described below. When the microcontroller 534 is triggered by the PIR sensors 540, the microcontroller 534 may be triggered to perform one or more functions. When the light sensor 518 detects a low level of ambient light, the light sensor 518 may trigger the microcontroller 534 to enable "night vision," as further described below. The microcontroller 534 may also act as a conduit for data communicated between various components and the communication module 530.

With further reference to FIG. 5, the communication module 530 may comprise an integrated circuit including a processor core, memory, and programmable input/output peripherals. The communication module 530 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 530 may receive inputs, such as power and/or data, from the camera PCB 542, the microcontroller 534, the button 306, the reset button 408, and/or the power PCB memory 536. When the button 306 is pressed, the communication module 530 may be triggered to perform one or more functions. When the reset button 408 is pressed, the communication module 530 may be triggered to erase any data stored at the power PCB memory 536 and/or at the camera PCB memory 544. The communication module 530 may also act as a conduit for data communicated between various components and the microcontroller 534. The power PCB memory 536 may comprise flash memory configured to store and/or transmit data. For example, in certain embodiments the power PCB memory 536 may comprise serial peripheral interface (SPI) flash memory.

With further reference to FIG. 5, the camera PCB 542 may comprise components that facilitate the operation of the camera 316. For example, an imager 546 may comprise a video recording sensor and/or a camera chip. In one aspect of the present disclosure, the imager 546 may comprise a complementary metal-oxide semiconductor (CMOS) array, and may be capable of recording high definition (e.g., 722p, 1080p, 4K, etc.) video files. A camera processor 526 may comprise an encoding and compression chip. In some embodiments, the camera processor 526 may comprise a bridge processor. The camera processor 526 may process video recorded by the imager 546 and audio recorded by the microphone 524, and may transform this data into a form suitable for wireless transfer by the communication module 530 to a network. The camera PCB memory 544 may comprise volatile and/or non-volatile memory that may be used when data is being buffered or encoded by the camera processor 526. For example, in certain embodiments the camera PCB memory 544 may comprise synchronous dynamic random access memory (SD RAM). IR LED's 548 may comprise light-emitting diodes capable of radiating infrared light. IR cut filter 550 may comprise a system that, when triggered, configures the imager 546 to see primarily infrared light as opposed to visible light. When the light sensor 518 detects a low level of ambient light (which may comprise a level that impedes the performance of the imager 546 in the visible spectrum), the IR LED's 548 may shine infrared light through the doorbell 302 enclosure out to the environment, and the IR cut filter 550 may enable the imager 546 to see this infrared light as it is reflected or refracted off of objects within the field of view of the doorbell. This process may provide the doorbell 302 with the "night vision" function mentioned above. As also shown in FIG. 5, the camera PCB 542 includes a computer vision module 552, which is described in greater detail below.

As discussed above, the present disclosure provides numerous examples of methods and systems including A/V doorbells, but the present embodiments are equally applicable for A/V devices other than doorbells. For example, the present embodiments may include one or more A/V security cameras instead of, or in addition to, one or more A/V doorbells. An example A/V security camera may include substantially all of the structure and functionality of the doorbell 302, but without the front button 306 and its associated components. An example A/V security camera may further omit other components, such as, for example, the bracket PCB 502 and its associated components.

Figure 6:
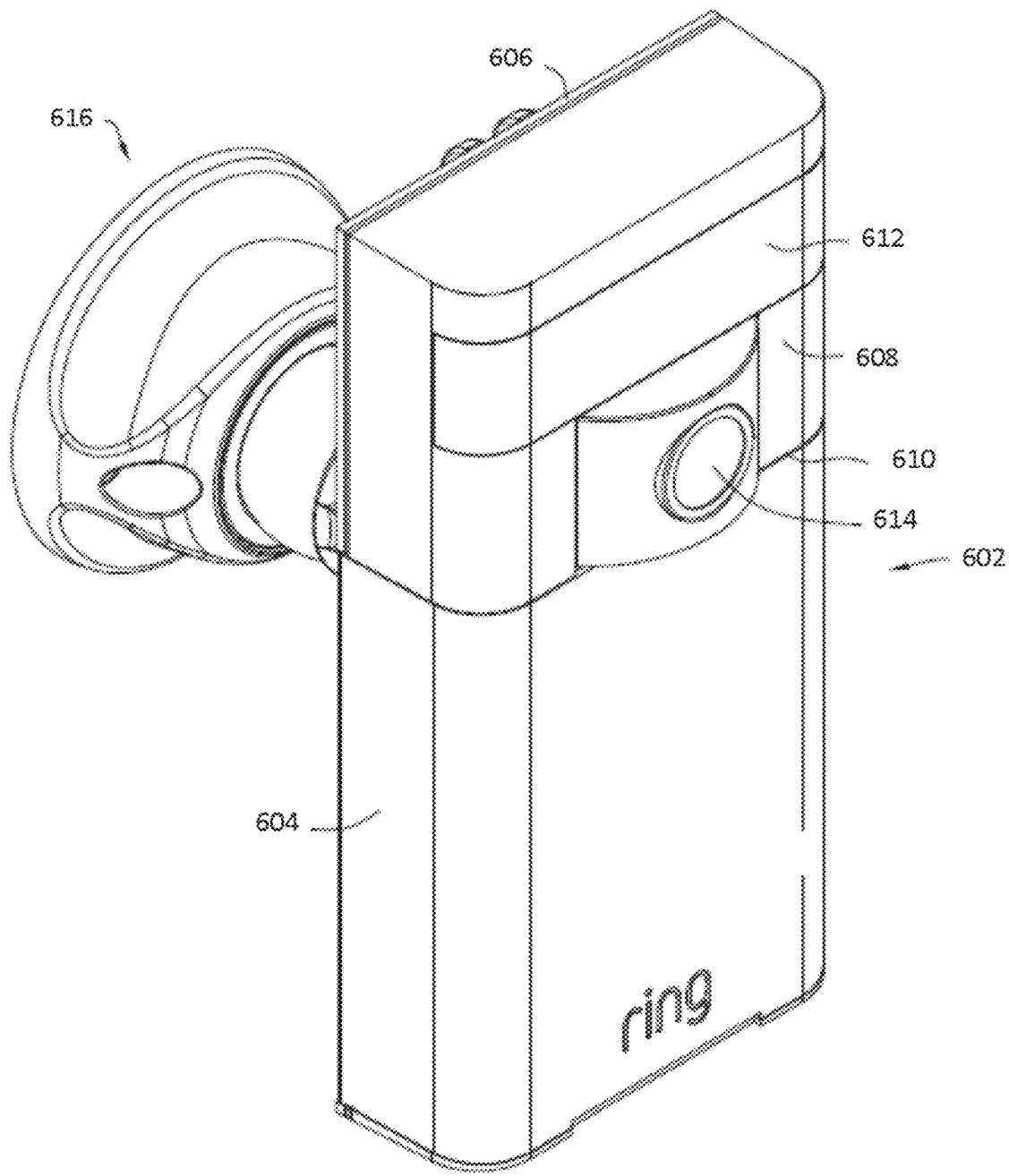
FIG. 6 is an upper front perspective view of an A/V recording and communication security camera (A/V security camera) according to various aspects of the present disclosure.
Figure 7:
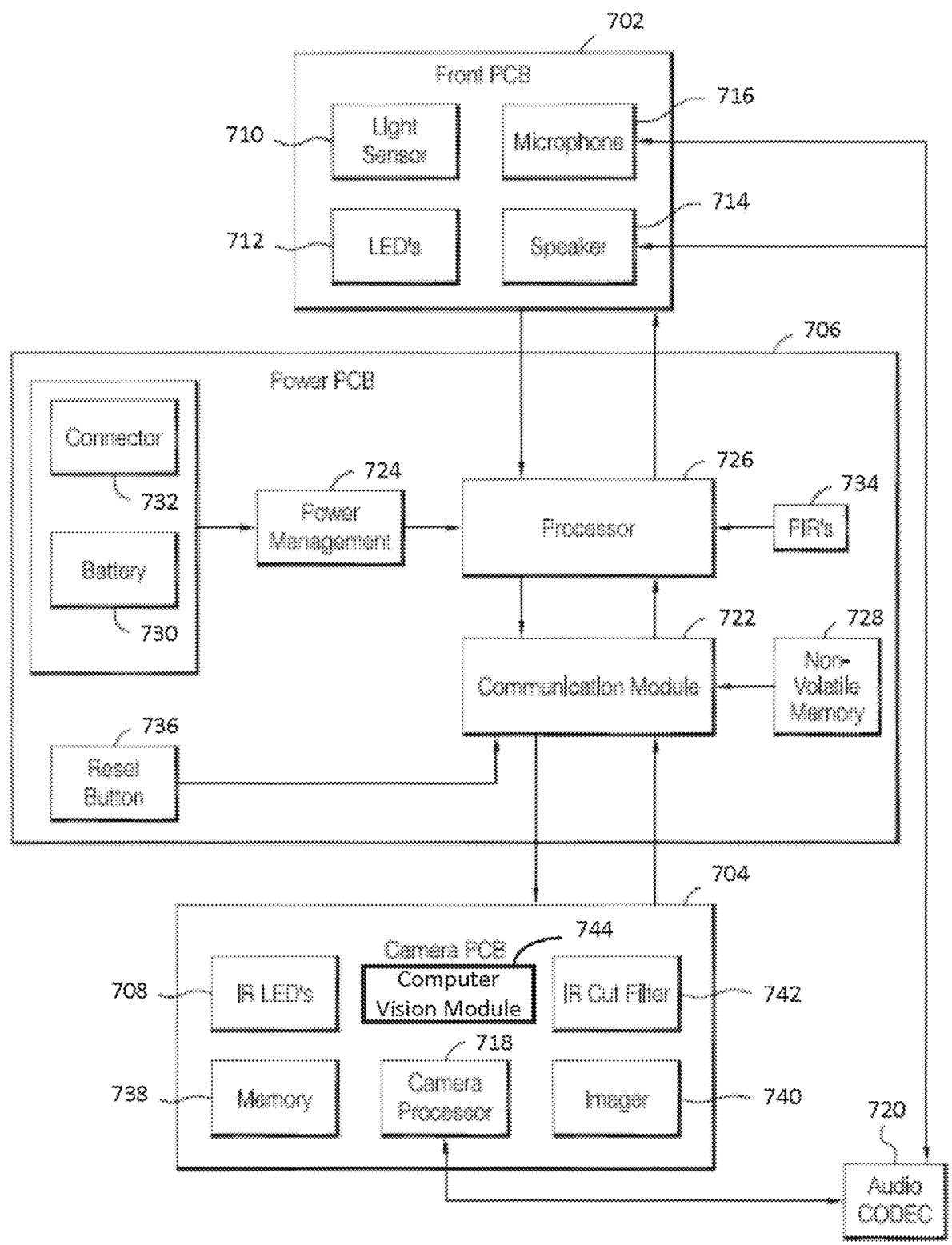
FIG. 7 is a functional block diagram of the components of the A/V security camera of FIG. 6.

FIGS. 6 and 7 illustrate an example A/V security camera according to various aspects of the present embodiments. With reference to FIG. 6, the security camera 602, similar to the video doorbell 302, includes a faceplate 604 that is mounted to a back plate 606 and an enclosure 608 that engages the faceplate 604. Collectively, the faceplate 604, the back plate 606, and the enclosure 608 form a housing that contains and protects the inner components of the security camera 602. However, unlike the video doorbell 302, the security camera 602 does not include any front button 306 for activating the doorbell. The faceplate 604 may comprise any suitable material, including, without limitation, metals, such as brushed aluminum or stainless steel, metal alloys, or plastics. The faceplate 604 protects the internal contents of the security camera 602 and serves as an exterior front surface of the security camera 602.

With continued reference to FIG. 6, the enclosure 608 engages the faceplate 604 and abuts an upper edge 610 of the faceplate 604. As discussed above with reference to FIG. 3, in alternative embodiments, one or more gaps between the enclosure 608 and the faceplate 604 may facilitate the passage of sound and/or light through the security camera 602. The enclosure 608 may comprise any suitable material, but in some embodiments the material of the enclosure 608 preferably permits infrared light to pass through from inside the security camera 602 to the environment and vice versa. The security camera 602 further includes a lens 612. Again, similar to the video doorbell 302, in some embodiments, the lens may comprise a Fresnel lens, which may be patterned to deflect incoming light into one or more infrared sensors located within the security camera 602. The security camera 602 further includes a camera 614, which captures video data when activated, as described above and below.

With further reference to FIG. 6, the enclosure 608 may extend from the front of the security camera 602 around to the back thereof and may fit snugly around a lip (not shown) of the back plate 606. The back plate 606 may comprise any suitable material, including, without limitation, metals, such as brushed aluminum or stainless steel, metal alloys, or plastics. The back plate 606 protects the internal contents of the security camera 602 and serves as an exterior rear surface of the security camera 602. The faceplate 604 may extend from the front of the security camera 602 and at least partially wrap around the back plate 606, thereby allowing a coupled connection between the faceplate 604 and the back plate 606. The back plate 606 may have indentations (not shown) in its structure to facilitate the coupling.

With continued reference to FIG. 6, the security camera 602 further comprises a mounting apparatus 616. The mounting apparatus 616 facilitates mounting the security camera 602 to a surface, such as an interior or exterior wall of a building, such as a home or office. The faceplate 604 may extend from the bottom of the security camera 602 up to just below the camera 614, and connect to the back plate 606 as described above. The lens 612 may extend and curl partially around the side of the security camera 602. The enclosure 608 may extend and curl around the side and top of the security camera 602, and may be coupled to the back plate 606 as described above. The camera 614 may protrude from the enclosure 608, thereby giving it a wider field of view. The mounting apparatus 616 may couple with the back plate 606, thereby creating an assembly including the security camera 602 and the mounting apparatus 616. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

FIG. 7 is a functional block diagram of the components of the A/V security camera of FIG. 6. With reference to FIG. 7, the interior of the wireless security camera 602 comprises a plurality of printed circuit boards, including a front PCB 702, a camera PCB 704, and a power PCB 706, each of which is described below. The camera PCB 704 comprises various components that enable the functionality of the camera 614 of the security camera 602, as described below. Infrared light-emitting components, such as infrared LED's 708, are coupled to the camera PCB 704 and may be triggered to activate when a light sensor detects a low level of ambient light. When activated, the infrared LED's 708 may emit infrared light through the enclosure 608 and/or the camera 614 out into the ambient environment. The camera 614, which may be configured to detect infrared light, may then capture the light emitted by the infrared LED's 708 as it reflects off objects within the camera's 614 field of view, so that the security camera 602 can clearly capture images at night (may be referred to as "night vision").

The front PCB 702 comprises various components that enable the functionality of the audio and light components, including a light sensor 710, LED's 712, one or more speakers 714, and a microphone 716. The light sensor 710 may be one or more sensors capable of detecting the level of ambient light of the surrounding environment in which the security camera 602 may be located. The speakers 714 may be any electromechanical device capable of producing sound in response to an electrical signal input. The microphone 716 may be an acoustic-to-electric transducer or sensor capable of converting sound waves into an electrical signal. The front PCB 702 and all components thereof may be electrically coupled to the power PCB 706, thereby allowing data and/or power to be transferred to and from the power PCB 706 and the front PCB 702.

The speakers 714 and the microphone 716 may be coupled to a camera processor 718 on the camera PCB 704 through an audio CODEC 720. For example, the transfer of digital audio from the user's client device 114 and the speakers 714 and the microphone 716 may be compressed and decompressed using the audio CODEC 720, coupled to the camera processor 718. Once compressed by audio CODEC 720, digital audio data may be sent through a communication module 722 to the network 112, routed by one or more servers 120, and delivered to the user's client device 114. When the user speaks, after being transferred through the network 112, digital audio data is decompressed by audio CODEC 720 and emitted to the visitor via the speakers 714.

With continued reference to FIG. 7, the power PCB 706 comprises various components that enable the functionality of the power and device-control components, including a power management module 724, a processor 726, the communication module 722, and power PCB memory 728 (which may be volatile and/or non-volatile memory). In certain embodiments, the power management module 724 may comprise an integrated circuit capable of arbitrating between multiple voltage rails, thereby selecting the source of power for the security camera 602. A battery 730 and/or a connector 732 may each provide power to the power management module 724. The power management module 724 (which may be similar to power management module 532) may have separate power rails dedicated to the battery 730 and the connector 732. The power management module 724 may control charging of the battery 730 when the connector 732 is connected to an external source of power, and may also serve as a conduit for data between the connector 732 and the processor 726.

With further reference to FIG. 7, in certain embodiments the processor 726 may comprise an integrated circuit including a processor core, memory, and programmable input/output peripherals. The processor 726 may receive input signals, such as data and/or power, from the PIR sensors 734, the power management module 724, the light sensor 710, the microphone 716, and/or the communication module 722, and may perform various functions as further described below. When the processor 726 is triggered by the PIR sensors 734, the processor 726 may be triggered to perform one or more functions, such as initiating recording of video images via the camera 614. When the light sensor 710 detects a low level of ambient light, the light sensor 710 may trigger the processor 726 to enable "night vision," as further described below. The processor 726 may also act as a conduit for data communicated between various components and the communication module 722.

The communication module 722 is coupled to the power PCB 706. The communication module 722 facilitates communication with devices in one or more remote locations, as further described below. The communication module 722 may comprise an integrated circuit including a processor core, memory, and programmable input/output peripherals. The communication module 722 may also be configured to transmit data wirelessly to a remote network device, such as the user's client device 114, the remote storage device 118, and/or the remote server 120, and may include one or more transceivers (not shown). The wireless communication may comprise one or more wireless networks, such as, without limitation, Wi-Fi, cellular, Bluetooth, and/or satellite networks. The communication module 722 may receive inputs, such as power and/or data, from the camera PCB 704, the processor 726, a reset button 736 (which may be similar to the reset button 408), and/or the power PCB memory 728. When the reset button 736 is pressed, the communication module 722 may be triggered to erase any data stored at the power PCB memory 728 and/or at the camera PCB memory 738. The communication module 722 may also act as a conduit for data communicated between various components and the processor 726. The power PCB memory 728 may comprise flash memory configured to store and/or transmit data. For example, in certain embodiments the power PCB memory 728 may comprise serial peripheral interface (SPI) flash memory.

The connector 732 may protrude outward from the power PCB 706 and extend through a hole in the back plate 606. The battery 730, which may be a rechargeable battery, may provide power to the components of the security camera 602.

With continued reference to FIG. 7, the power PCB 706 further comprises the passive infrared (PIR) sensors 734, which may be secured on or within a PIR sensor holder (not shown) that resides behind the lens 612 (FIG. 6). The PIR sensors 734 may be any type of sensor capable of detecting and communicating the presence of a heat source within their field of view. Further, alternative embodiments may comprise one or more motion sensors either in place of or in addition to the PIR sensors 734. The motion sensors may be configured to detect motion using any methodology, such as a methodology that does not rely on detecting the presence of a heat source within a field of view.

With further reference to FIG. 7, the camera PCB 704 may comprise components that facilitate the operation of the camera 614. For example, an imager 740 may comprise a video recording sensor and/or a camera chip. In one aspect of the present disclosure, the imager 740 may comprise a complementary metal-oxide semiconductor (CMOS) array, and may be capable of recording high definition (e.g., 722p or better) video files. The camera processor 718 may comprise an encoding and compression chip. In some embodiments, the camera processor 718 may comprise a bridge processor. The camera processor 718 may process video recorded by the imager 740 and audio recorded by the microphone 716, and may transform this data into a form suitable for wireless transfer by the communication module 722 to a network. The camera PCB memory 738 may comprise volatile or non-volatile memory that may be used when data is being buffered or encoded by the camera processor 718. For example, in certain embodiments the camera PCB memory 738 may comprise synchronous dynamic random access memory (SD RAM). IR LED's 708 may comprise light-emitting diodes capable of radiating infrared light. IR cut filter 742 may comprise a system that, when triggered, configures the imager 740 to see primarily infrared light as opposed to visible light. When the light sensor 710 detects a low level of ambient light (which may comprise a level that impedes the performance of the imager 740 in the visible spectrum), the IR LED's 708 may shine infrared light through the security camera 602 enclosure out to the environment, and the IR cut filter 742 may enable the imager 740 to see this infrared light as it is reflected or refracted off of objects within the field of view of the doorbell. This process may provide the security camera 602 with the "night vision" function mentioned above.

The camera PCB 704 further includes a computer vision module 744. Functionality of the computer vision module 744 is described in greater detail below.

Figure 8:
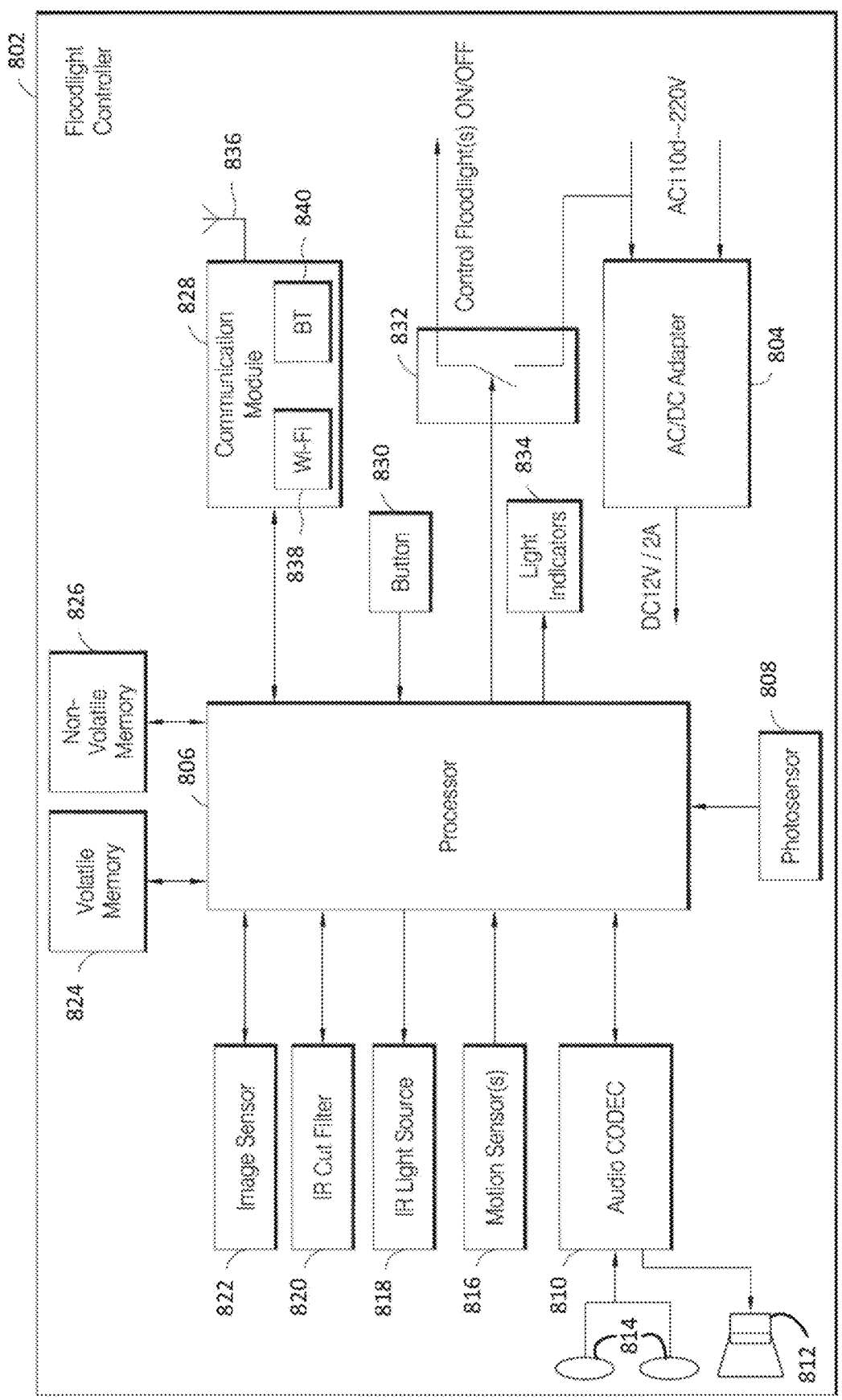
FIG. 8 is a functional block diagram of the components of a floodlight controller with A/V recording and communication features according to various aspects of the present disclosure.
Figure 9:
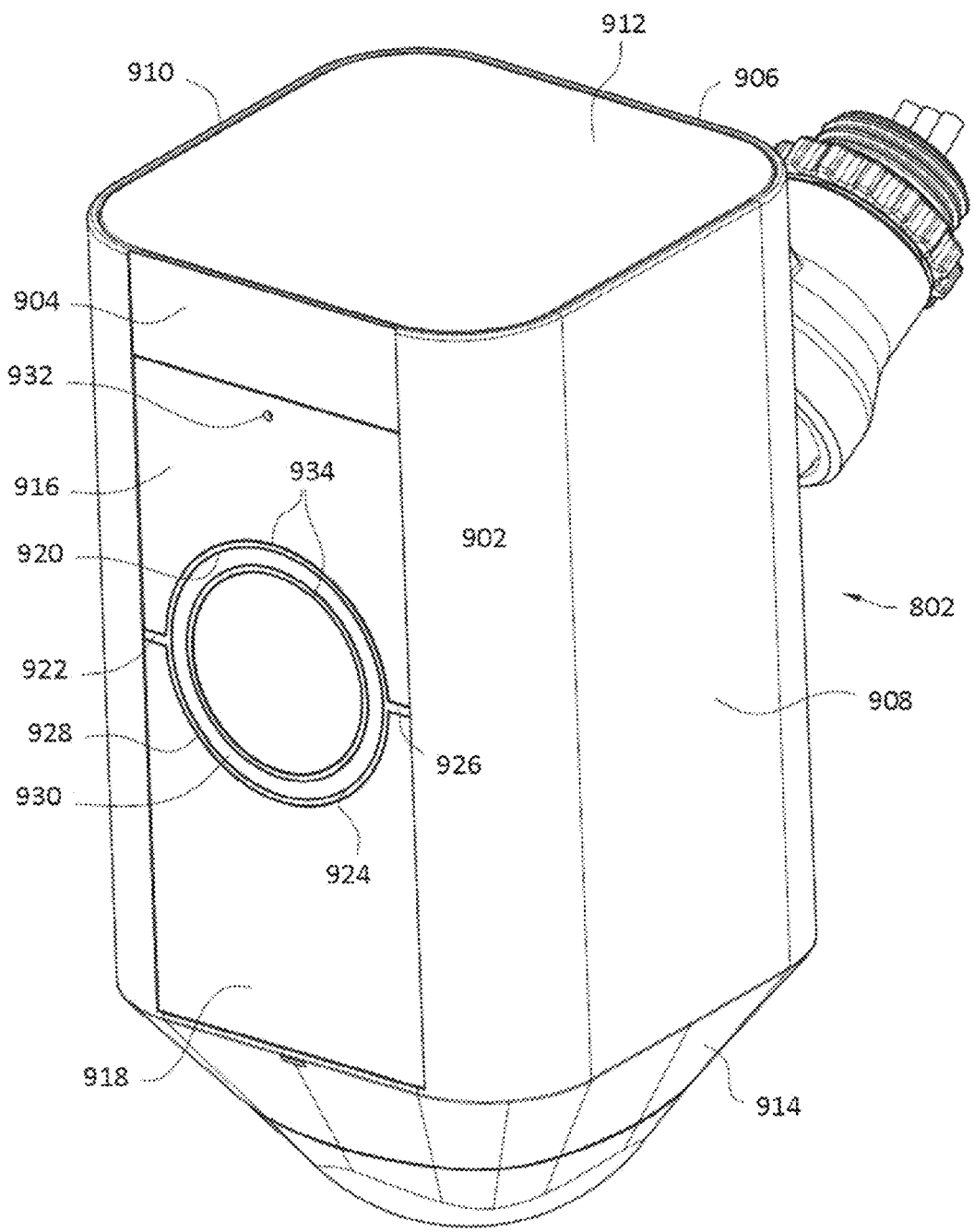
FIG. 9 is an upper front perspective view of a floodlight controller with A/V recording and communication features according to various aspects of the present disclosure.
Figure 10:
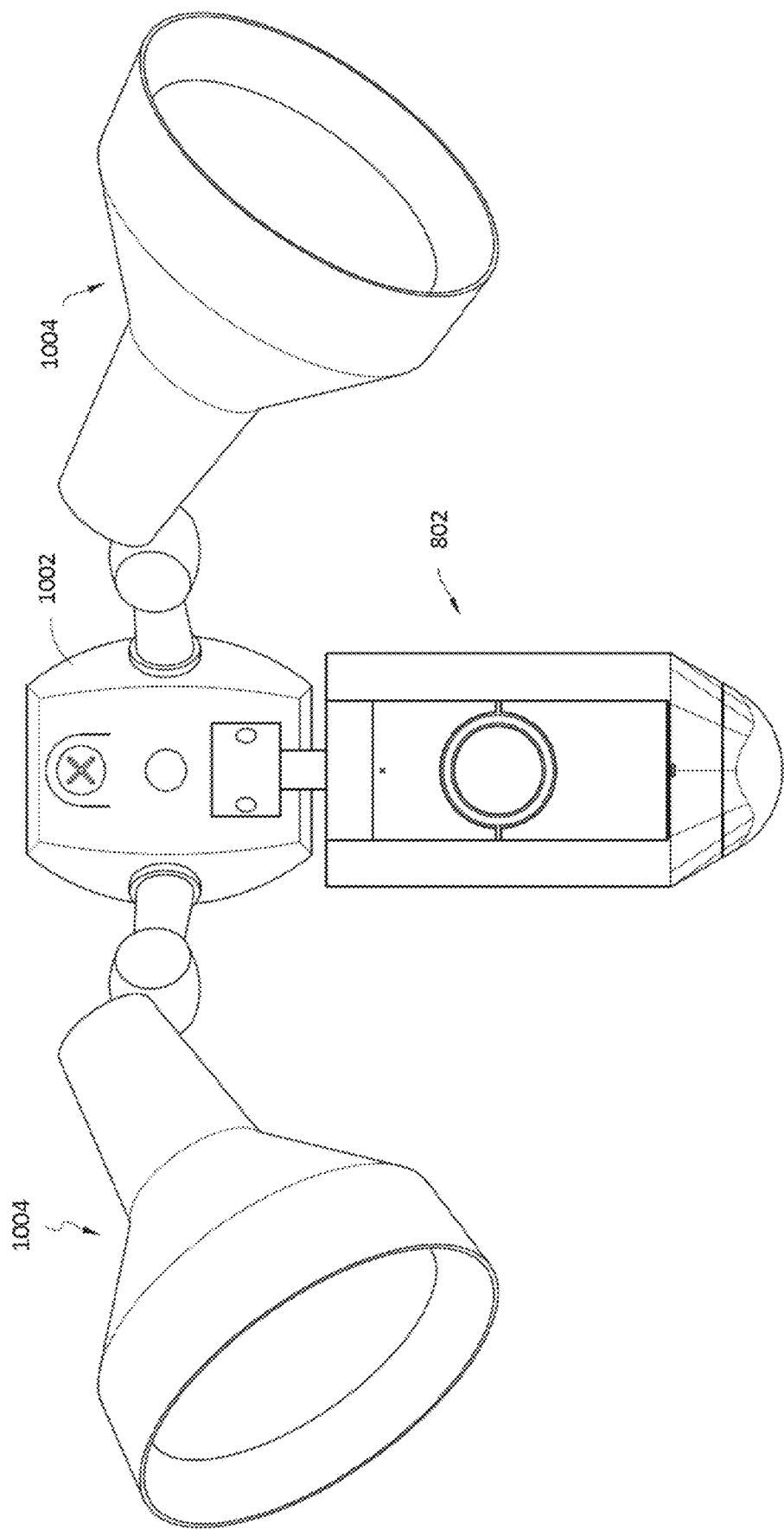
FIG. 10 is a front elevation view of the floodlight controller with A/V recording and communication features of FIG. 9 in combination with a floodlight device according to various aspects of the present disclosure.

As discussed above, the present disclosure provides numerous examples of methods and systems including A/V doorbells, but the present embodiments are equally applicable for A/V devices other than doorbells. For example, the present embodiments may include one or more A/V floodlight controllers instead of, or in addition to, one or more A/V doorbells. FIGS. 8-10 illustrate an example A/V floodlight controller according to various aspects of the present embodiments. FIG. 8 is a functional block diagram illustrating various components of the floodlight controller 802 and their relationships to one another. For example, the floodlight controller 802 comprises an AC/DC adapter 804. The floodlight controller 802 is thus configured to be connected to a source of external AC (alternating-current) power, such as a household AC power supply (may also be referred to as AC mains). The AC power may have a voltage in the range of 110-240 VAC, or 110-220 VAC, for example. The incoming AC power may be received by the AC/DC adapter 804, which may convert the incoming AC power to DC (direct-current) and may step down the voltage from 110-220 VAC to a lower output voltage of about 12 VDC and an output current of about 2 A, for example. In various embodiments, the output of the AC/DC adapter 804 may be in a range of from about 9 V to about 15 V, for example, and in a range of from about 0.5 A to about 5 A, for example. These voltages and currents are only examples provided for illustration and are not limiting in any way.

With further reference to FIG. 8, the floodlight controller 802 further comprises other components, including a processor 806 (may also be referred to as a controller), a photosensor 808, an audio CODEC (coder-decoder) 810, at least one speaker 812 (which may be similar to speaker 108), the at least one microphone 814 (which may be similar to microphone 106), at least one motion sensor 816, an infrared (IR) light source 818, an IR cut filter 820, an image sensor 822 (may be a component of the camera 104, and may be referred to interchangeably as the camera 104), volatile memory 824, non-volatile memory 826, a communication module 828, a button 830, a switch 832 for controlling one or more floodlights, and a plurality of light indicators 834. Each of these components is described in detail below.

With further reference to FIG. 8, the processor 806 may perform data processing and various other functions, as described below. The processor 806 may comprise an integrated circuit including a processor core, the volatile memory 824, the non-volatile memory 826, and/or programmable input/output peripherals (not shown). The volatile memory 824 may comprise, for example, DDR3 SDRAM (double data rate type three synchronous dynamic random-access memory). The non-volatile memory 826 may comprise, for example, NAND flash memory. In the embodiment illustrated in FIG. 8, the volatile memory 824 and the non-volatile memory 826 are illustrated outside the box representing the processor 806. The embodiment illustrated in FIG. 8 is, however, merely an example, and in some embodiments the volatile memory 824 and/or the non-volatile memory 826 may be physically incorporated with the processor 806, such as on the same chip. The volatile memory 824 and/or the non-volatile memory 826, regardless of their physical location, may be shared by one or more other components (in addition to the processor 806) of the present floodlight controller 802.

With further reference to FIG. 8, the image sensor 822 (camera 104), the IR light source 818, the IR cut filter 820, and the photosensor 808 are all operatively coupled to the processor 806. As described in detail below, the IR light source 818 and the IR cut filter 820 facilitate "night vision" functionality of the image sensor 822. For example, the photosensor 808 is configured to detect the level of ambient light about the floodlight controller 802. The processor 806 uses the input from the photosensor 808 to control the states of the IR light source 818 and the IR cut filter 820 to activate and deactivate night vision, as described below. In some embodiments, the image sensor 822 may comprise a video recording sensor or a camera chip. In some embodiments, the IR light source 818 may comprise one or more IR light-emitting diodes (LEDs).

With further reference to FIG. 8, the at least one speaker 812 and the at least one microphone 814 are operatively coupled to the audio CODEC 810, which is operatively coupled to the processor 806. The transfer of digital audio between the user and a visitor (or intruder) may be compressed and decompressed using the audio CODEC 810, as described below. The motion sensor(s) 816 is also operatively coupled to the processor 806. The motion sensor(s) 816 may comprise, for example, passive infrared (PIR) sensors, or any other type of sensor capable of detecting and communicating to the processor 806 the presence and/or motion of an object within its field of view. When the processor 806 is triggered by the motion sensor(s) 816, the processor 806 may perform one or more functions, as described below.

With further reference to FIG. 8, the communication module 828 is operatively coupled to the processor 806. The communication module 828, which includes at least one antenna 836, is configured to handle communication links between the floodlight controller 802 and other, external devices or receivers, and to route incoming/outgoing data appropriately. For example, inbound data from the antenna(s) 836 may be routed through the communication module 828 before being directed to the processor 806, and outbound data from the processor 806 may be routed through the communication module 828 before being directed to the antenna(s) 836. The communication module 828 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, Bluetooth, or any other protocol and/or technology. In the illustrated embodiment, the communication module 828 includes a Wi-Fi chip 838 and a Bluetooth chip 840, but these components are merely examples and are not limiting. Further, while the Wi-Fi chip 838 and the Bluetooth chip 840 are illustrated within the box representing the communication module 828, the embodiment illustrated in FIG. 8 is merely an example, and in some embodiments the Wi-Fi chip 838 and/or the Bluetooth chip 840 are not necessarily physically incorporated with the communication module 828.

In some embodiments, the communication module 828 may further comprise a wireless repeater (not shown, may also be referred to as a wireless range extender). The wireless repeater is configured to receive a wireless signal from a wireless router (or another network device) in the user's network 110 and rebroadcast the signal. Wireless devices that are not within the broadcast range of the wireless router, or that only weakly receive the wireless signal from the wireless router, may receive the rebroadcast signal from the wireless repeater of the communication module 828, and may thus connect to the user's network 110 through the floodlight controller 802. In some embodiments, the wireless repeater may include one or more transceiver modules (not shown) capable of transmitting and receiving data, and using, for example, one or more protocols and/or technologies, such as Wi-Fi (IEEE 802.11), WiMAX (IEEE 802.16), or any other protocol and/or technology.

With further reference to FIG. 8, when a visitor (or intruder) who is present in the area about the floodlight controller 802 speaks, audio from the visitor (or intruder) is received by the microphone(s) 814 and compressed by the audio CODEC 810. Digital audio data is then sent through the communication module 828 to the network 112 (FIG. 1) via the user's network 110, routed by the server 120 and/or the API 122, and delivered to the user's client device 114. When the user speaks, after being transferred through the network 112, the user's network 110, and the communication module 828, the digital audio data from the user is decompressed by the audio CODEC 810 and emitted to the visitor through the speaker 812, which may be driven by a speaker driver (not shown).

With further reference to FIG. 8, the button 830 is operatively coupled to the processor 806. The button 830 may have one or more functions, such as changing an operating mode of the floodlight controller 802 and/or triggering a reset of the floodlight controller 802. For example, when the button 830 is pressed and released, it may cause the communication module 828 of the floodlight controller 802 to enter access point (AP) mode, which may facilitate connecting the floodlight controller 802 to the user's network 110. Alternatively, or in addition, when the button 830 is pressed and held down for at least a threshold amount of time, it may trigger the erasing of any data stored at the volatile memory 824 and/or at the non-volatile memory 826, and/or may trigger a reboot of the processor 806.

With reference to FIG. 9, the floodlight controller 802 comprises a housing 902 for containing and protecting the interior components of the floodlight controller 802. The housing 902 includes a front wall 904, a rear wall 906, opposing side walls 908, 910, an upper wall 912, and a tapered lower portion 914. The front wall 904 includes a central opening that receives an upper shield 916 and a lower grill 918. In the illustrated embodiment, front surfaces of the upper shield 916 and the lower grill 918 are substantially flush with a front surface of the front wall 904, but in alternative embodiments these surfaces may not be flush with one another. The upper shield 916 is substantially rectangular, and includes a semicircular indentation 920 along its lower edge 922. The lower grill 918 is substantially rectangular, and includes a semicircular indentation 924 along its upper edge 926. Together, the semicircular indentations 920, 924 in the upper shield 916 and the lower grill 918 form a circular opening 928 that accommodates a light pipe 930. A cover extends across and closes an outer open end of the light pipe 930. The upper shield 916, the lower grill 918, the light pipe 930, and the cover are all described in further detail below. The camera (not shown) is located in the circular opening 928 formed by the upper shield 916 and the lower grill 918, behind the cover, and is surrounded by the light pipe 930.

With reference to FIG. 8, the floodlight controller 802 further comprises the microphones 814. In the illustrated embodiment, a first one of the microphones 814 is located along the front of the floodlight controller 802 behind the upper shield 916 (FIG. 9) and a second one of the microphones 814 is located along the left side of the floodlight controller 802 behind the left-side wall 910 (FIG. 9) of the housing 902. Including two microphones that are spaced from one another and located on different sides of the floodlight controller 802 provides the illustrated embodiment of the floodlight controller 802 with advantageous noise cancelling and/or echo cancelling for clearer audio. The illustrated embodiment is, however, just one example and is not limiting. Alternative embodiments may only include one microphone 814, or include two microphones 814 in different locations than as illustrated in FIG. 8.

With reference to FIG. 9, the upper shield 916 may include a first microphone opening 932 located in front of the first microphone 814 to facilitate the passage of sound through the upper shield 916 so that sounds from the area about the floodlight controller 802 can reach the first microphone 814. The left-side wall 910 of the housing 902 may include a second microphone opening (not shown) located in front of the second microphone 814 that facilitates the passage of sound through the left-side wall 910 of the housing 902 so that sounds from the area about the floodlight controller 802 can reach the second microphone 814.

With further reference to FIG. 9, the floodlight controller 802 may further comprise a light barrier 934 surrounding inner and outer surfaces of the light pipe 930. The light barrier 934 may comprise a substantially opaque material that prevents the light generated by the light indicators 834 from bleeding into the interior spaces of the floodlight controller 802 around the light pipe 930. The light barrier 934 may comprise a resilient material, such as a plastic, which may also advantageously provide moisture sealing at the junctures between the light pipe 930 and the upper shield 916 and the lower grill 918. Portions of the light barrier 934 may also extend between the junctures between the upper shield 916 and the lower grill 918.

With further reference to FIG. 9, the floodlight controller 802 further comprises connecting hardware configured for connecting the floodlight controller 802 to a floodlight device 1002 (FIG. 10) and a power source (not shown). The floodlight controller 802 further comprises a plurality of wires for connecting the floodlight controller 802 to the power supply and to the floodlight(s) 1004 (FIG. 10) of the floodlight device 1002 (for enabling the floodlight controller 802 to turn the floodlight(s) 1004 on and off). In the illustrated embodiment, three wires may be used, but the illustrated embodiment is merely one example and is not limiting. In alternative embodiments, any number of wires may be provided.

Some of the present embodiments may comprise computer vision for one or more aspects, such as object and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Typical functions and components (e.g., hardware) found in many computer vision systems are described in the following paragraphs. The present embodiments may include at least some of these aspects. For example, with reference to FIGS. 3-5, embodiments of the present A/V doorbell 302 may include a computer vision module 552. In addition, with reference to FIGS. 6-7, embodiments of the present security camera 602 may include a computer vision module 744. The computer vision module 552, and/or the computer vision module 744, may include any of the components (e.g., hardware) and/or functionality described herein with respect to computer vision, including, without limitation, one or more cameras, sensors, and/or processors. In some of the present embodiments, with reference to FIGS. 3-5, the microphone 524, the camera 316, and/or the imager 546 may be components of the computer vision module 552.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the computer vision module 534). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three cameras that point at different angles; one camera pointing at the front of the subject, a second one to the side, and a third one at an angle. All these cameras work together to detect a subject's face in real time, and to face-detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is, or is not, authorized to take certain actions with respect to a property or expensive item of collateral. For example, with reference to FIGS. 3-5, the computer vision module 552, and/or the imager 546 and/or the processor 534 (and with reference to FIGS. 6-7, the computer vision module 744, and/or the imager 740 and/or the processor 726) may receive information about the person using any one, or any combination of more than one, of the foregoing biometrics.

It may be advantageous to modify various settings associated with an A/V recording and communication device (A/V device) when a user accesses an application associated with the A/V device on a client device. For example, it may be advantageous for users to experience little to no latency when attempting to remotely access a camera of the A/V device. However, it may be difficult to anticipate usage, and may not be practical to maintain a continuous connection between the A/V device and the server (e.g., power consumption, bandwidth utilization, etc.). Therefore, it may be advantageous to enable modification of a setting for a keep-alive interval (e.g., a frequency with which the A/V device performs a check-in with a server with which it is operatively connected) of the A/V device. If the user, within an interval of time, may attempt to access the camera of the A/V device, then the keep-alive interval (e.g., an amount of time) may be set to a very short duration, thereby reducing or eliminating any latency that the user might experience when attempting to remotely access the camera.

In some embodiments, the A/V device includes a processor that transitions between a low-power state and an active state. During the active state, the A/V device may communicate with the server over a wired and/or wireless network, such as the user's network described in greater detail below. The process of periodically or aperiodically transitioning to the active state and communicating with the server, for the purpose of the present disclosure, may be referred to as a check-in procedure. In various embodiments, the check-in interval or keep-alive interval may be set during a setup procedure and/or installation of the A/V device based at least in part on various aspects of the setup procedure and/or installation of the A/V device (e.g., power supply, signal strength, number of devices on the user's network, etc.). A longer keep-alive interval may reduce network congestion and power consumption, but may introduce latency when the user attempts to receive images and other information captured by the A/V device. The present disclosure describes systems and methods that enable the server to dynamically modify the settings of the A/V device to reduce latency and improve the user experience.

In one example, when the user launches an application that enables the user to interact with the A/V device, the server detects the user interaction with the application and causes the A/V device to reduce the duration of the keep-alive interval. As described in greater detail below, the application may be maintained in the memory of a client device, and may include source code and/or other executable code (e.g., machine-readable instructions) that, when executed by one or more processors of the client device, enables the client device to communicate with the A/V device, for example, via the server. In various embodiments, the server causes the A/V device to enter a waiting state. The waiting state may prevent the A/V device from entering a low-power state such that the A/V device is capable of receiving signals (e.g., commands) from the server.

In another example, a particular interaction and/or type of interaction causes the server to reduce the duration of the keep-alive interval of the A/V device. Interaction with (e.g., selection of) a particular user interface element may indicate that the user will likely request video data and/or other data obtained from the A/V device. As such, in various embodiments, interaction with such elements may cause the server to reduce the duration of the keep-alive interval and/or place the A/V device in a waiting state. As described in greater detail below, reducing the duration of the keep-alive interval and/or placing the A/V device in a waiting state may cause the A/V device to begin capturing video data from the camera in certain embodiments. In another example, the server, when modifying the settings of the A/V device, causes the A/V device to return device health information and/or a snapshot of the field of view of the camera.

In some embodiments, the server maintains a socket connection or other connection with the A/V device such that the server can transmit commands to the A/V device without requiring the A/V device to periodically or aperiodically check-in. In such embodiments, when the user interacts with (e.g., selects) the application and/or a particular user element of the application, the server may test and/or re-establish the connection with the A/V device. In certain embodiments, user interaction with the application and/or particular user element of the application may cause the server to modify motion zones and/or sensitivity of motion sensors of the A/V device. In some embodiments, user interaction with the application and/or particular user element of the application may cause the server to reduce a snooze interval (e.g., an interval of time after an event during which new event notifications are suppressed) associated with notification to the user. In an example, if the user is modifying motion zones associated with the A/V device, the snooze interval is set to one second so that the user can adjust the motion zone without unnecessary delay.

Figure 11:
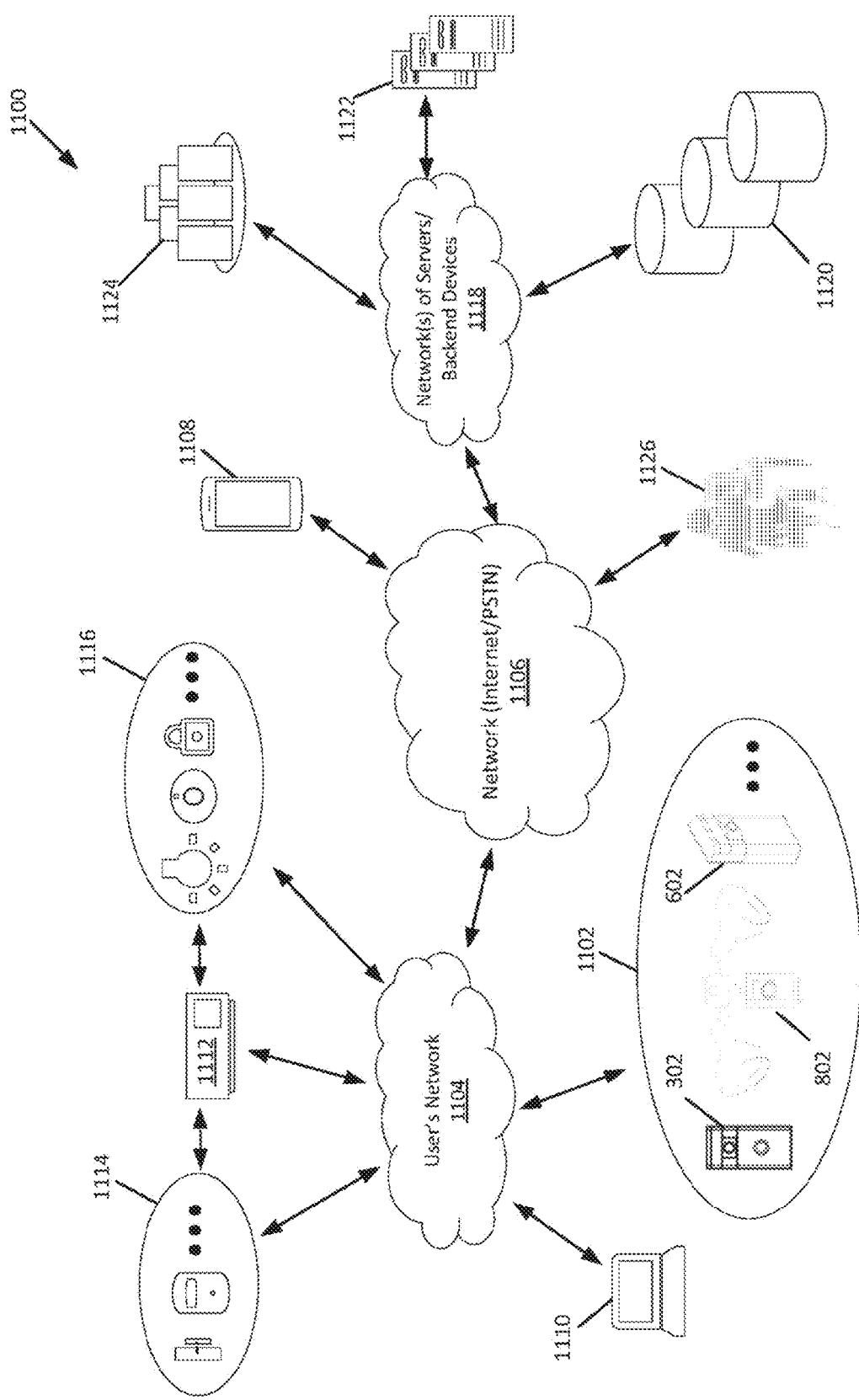
FIG. 11 is a functional block diagram illustrating a system for communicating in a network according to various aspects of the present disclosure.

FIG. 11 is a functional block diagram illustrating a system 1100 for communicating in a network according to various aspects of the present disclosure. The system 1100 may include one or more A/V devices 1102 configured to access a user's network 1104 (which may correspond to the user's network 110) to connect to a network (Internet/PSTN) 1106

(in some embodiments, the devices 1102 may be configured to connect directly to the network (Internet/PSTN) 1106, such as over a cellular connection). The one or more A/V devices 1102 may include any or all of the components and/or functionality of the A/V device 102 (FIGS. 1-2), the A/V recording and communication doorbell (A/V doorbell) 302 (FIGS. 3-5), the security camera 602 (FIGS. 6-7), and/or the floodlight controller (A/V floodlight controller) 802 (FIGS. 8-10).

The user's network 1104 may include any or all of the components and/or functionality of the user's network 110 described herein. The system 1100 may also include one or more client devices 1108, 1110, which in various embodiments may be configured to be in network communication and/or associated with the A/V device 1102. The client devices 1108, 1110 may comprise, for example, a mobile phone such as a smartphone, or a computing device such as a tablet computer, a laptop computer, a desktop computer, etc. The client devices 1108, 1110 may include any or all of the components and/or functionality of the client device 114 (FIG. 1) and/or the client device 1800 (FIG. 18) described herein. In some embodiments, one or more of the client devices 1108, 1110 may not be associated with the A/V device 1102.

The system 1100 may further include a smart-home hub device 1112 (which may alternatively be referred to herein as the hub device 1112) connected to the user's network 1104. The smart-home hub device 1112 (also known as a home automation hub, gateway device, etc.), may comprise any device that facilitates communication with and control of the sensors 1114, automation devices 1116, and/or the one or more A/V devices 1102. For example, the smart-home hub device 1112 may be a component of a home automation system installed at a property. In some embodiments, the A/V devices 1102, the sensors 1114, and/or the automation devices 1116 may communicate with the smart-home hub device 1112 directly and/or indirectly via the user's network 1104 and/or the network (Internet/PSTN) 1106. In some of the present embodiments, the A/V devices 1102, the sensors 1114, and/or the automation devices 1116 may, in addition to or in lieu of communicating with the smart-home hub device 1112, communicate with the client devices 1108, 1110 and/or one or more of the components of the network of servers/backend devices 1118 directly and/or indirectly via the user's network 1104 and/or the network (Internet/PSTN) 1106.

Home automation, or smart home, is building automation for the home. It involves the control and automation of various devices and/or systems, such as lighting, heating (such as smart thermostats), ventilation, air conditioning (HVAC), blinds/shades, and security, as well as home appliances, such as washers/dryers, ovens, or refrigerators/freezers. Wi-Fi is often used for remote monitoring and control. Smart home devices (e.g., the hub device 1112, the sensors 1114, the automation devices 1116, the A/V devices 1102, etc.), when remotely monitored and controlled via the network (Internet/PSTN) 1106, may be considered to be components of the Internet of Things. Smart home systems may include switches and/or sensors (e.g., the sensors 1114) connected to a central hub such as the smart-home hub device 1112, sometimes called a gateway, from which the system may be controlled with a user interface. The user interface may include any or all of a wall-mounted terminal (e.g., a keypad, a touchscreen, etc.), software installed on the client devices 1108, 1110 (e.g., a mobile application), a tablet computer or a web interface, often but not always via Internet cloud services. The home automation system may use one or more communication protocols, including either or both of wired and wireless protocols, including but not limited to Wi-Fi, X10, Ethernet, RS-485, 6LoWPAN, Bluetooth LE (BTLE), ZigBee, and Z-Wave.

The one or more sensors 1114 may include, for example, at least one of a door sensor, a window sensor, a contact sensor, a tilt sensor, a temperature sensor, a carbon monoxide sensor, a smoke detector, a light sensor, a glass break sensor, a motion sensor, and/or other sensors that may provide the user/owner of the security system a notification of a security event at his or her property.

The one or more automation devices 1116 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, and/or other automation devices.

As described herein, in some of the present embodiments, some or all of the user's network 1104, the client devices 1108, 1110, the A/V device 1102, the smart-home hub device 1112, the sensors 1114, and the automation devices 1116 may be referred to as a security system, which may be installed at a property or premises.

With further reference to FIG. 11, the system 1100 may also include various backend devices such as (but not limited to) storage devices 1120, servers 1122, and APIs 1124 that may be in network communication (e.g., over the user's network 1104 and/or the network (Internet/PSTN) 1106) with the A/V devices 1102, the hub device 1112, the client devices 1108, 1110, the sensors 1114, and/or the automation devices 1116. In some embodiments, the storage devices 1120 may be a separate device from the servers 1122 (as illustrated) or may be an integral component of the servers 1122. The storage devices 1120 may be similar in structure and/or function to the storage device 118 (FIG. 1). In addition, in some embodiments, the servers 1122 and APIs 1124 may be similar in structure and/or function to the server 120 and the API 122 (FIG. 1), respectively.

With further reference to FIG. 11, the system 1100 may also include a security monitoring service 1126. The security monitoring service 1126 may be operated by the same company that manufactures, sells, and/or distributes the A/V devices 1102, the hub device 1112, the sensors 1114, and/or the automation devices 1116. In certain embodiments, the security monitoring service 1126 may be operated by a third-party company (e.g., a different company than the one that manufactured, sold, and/or distributed the A/V devices 1102, the hub device 1112, the sensors 1114, and/or the automation devices 1116). In any of the present embodiments, the security monitoring service 1126 may have control of at least some of the features and components of the security system (e.g., the security monitoring service 1126 may be able to arm and/or disarm the security system, lock and/or unlock doors, activate and/or deactivate one or more of the sensors 1114 and/or the automation devices 1116, etc.). For example, the security monitoring service 1126 may operate and control their own client devices and/or network of servers/backend devices for monitoring and/or controlling security systems. In such an example, the A/V devices 1102, the hub device 1112, the sensors 1114, and/or the automation devices 1116 may communicate with the client devices and/or one or more components of the network of servers/backend devices of the security monitoring service 1126 over the network (Internet/PSTN) 1106

(in some embodiments, via one or more of the components of the network of servers/backend devices 1118).

In various embodiments, the client devices 1108, 1110 execute (using one or more processors) an application or other executable code maintained in memory of the client devices 1108, 1110 configured to control, manage, or otherwise interact with the A/V devices 1102, the hub device 1112, the sensors 1114, and/or the automation devices 1116. In one example, the application allows the user to receive live audio/video data (e.g., streaming video images from a camera of a particular A/V device) from the A/V devices 1102 displayed on the client devices 1108, 1110. In another example, the application allows the user to modify security settings of the hub device 1112 and/or control the automation devices 1116 (e.g., turn off lights, raise window shades, etc.). In some embodiments, when the user interacts with the application (e.g., launches the application, uses an input device to select a particular user interface element, provides a command, etc.), the application causes information to be transmitted to the network of servers/backend devices 1118 (e.g., the server 1122). In an example, the information transmitted to the network of servers/backend devices 1118 includes a request for live audio/video data from the A/V devices 1102. In yet another example, the information transmitted to the network of servers/backend devices 1118 includes an indication that the user has launched an instance of the application on the client device 1108.

The network of servers/backend devices 1118 (e.g., the server 1122), in response to the information obtained from the client devices 1108, 1110, updates or otherwise communicates with the A/V device to reduce latency experienced by the user of the client devices 1108, 1110 when interacting with the A/V devices 1102. In an embodiment, the server 1122 modifies a keep-alive interval associated with the A/V devices 1102 such that the A/V devices 1102 check-in or otherwise communicate with the server 1122 more frequently (relative to a previous keep-alive interval). For example, the keep-alive interval may be set, without limitation, to 45 seconds and, in response to obtaining information from the client devices 1108, 1110 that the user has launched the application, the server 1122 determines a modified keep-alive interval of 2 seconds. The modified keep-alive interval may be valid or otherwise used by the A/V devices 1102 for duration of time, while the user is accessing the application, or until the user transmits a particular command and/or request (e.g., a request to stream live audio/video data). Returning to the example above, at the termination of the keep-alive interval, the A/V devices 1102 may check-in with the server 1122 (e.g., transmit an update request to the server 1122) and receive the modified keep-alive interval from the server 1122. In response, the A/V devices 1102 may use the modified keep-alive interval to determine when to transition between the low-power state and the active state. In certain embodiments, when the client devices 1108, 1110 indicates that further interaction with the A/V devices 1102 is less likely (e.g., when the application running on the client device is closed and/or no longer displayed on the screen of the client device), the server 1122 may restore the keep-alive interval to its previous value (e.g., by sending a command to the A/V devices 1102). In certain embodiments, the A/V devices 1102 may restore the previous keep-alive interval value after a predefined period (e.g., sixty seconds) when no further interaction occurs with the client devices 1108, 1110.

In certain embodiments, the server 1122 and the A/V devices 1102 maintain a socket connection to enable network communication over various networks (e.g., the user's network 1104 and/or the network of servers/backend devices 1118). When using a socket connection, the server 1122 establishes an address or otherwise binds an address that the A/V devices 1102 use to communicate with the server 1122. Once the address is established, in various embodiments, the server 1122 and/or the A/V devices 1102 wait for a request. In an example, the A/V devices 1102 wait for a request, transmitted over the socket connection, from the server 1122, for audio/video data from the A/V devices 1102. When using socket connections, in various embodiments, in response to the server 1122 obtaining information from the client devices 1108, 1110 indicating user access to the application, the server 1122 transmits a request over the socket connection to the A/V devices 1102.

Figure 12:
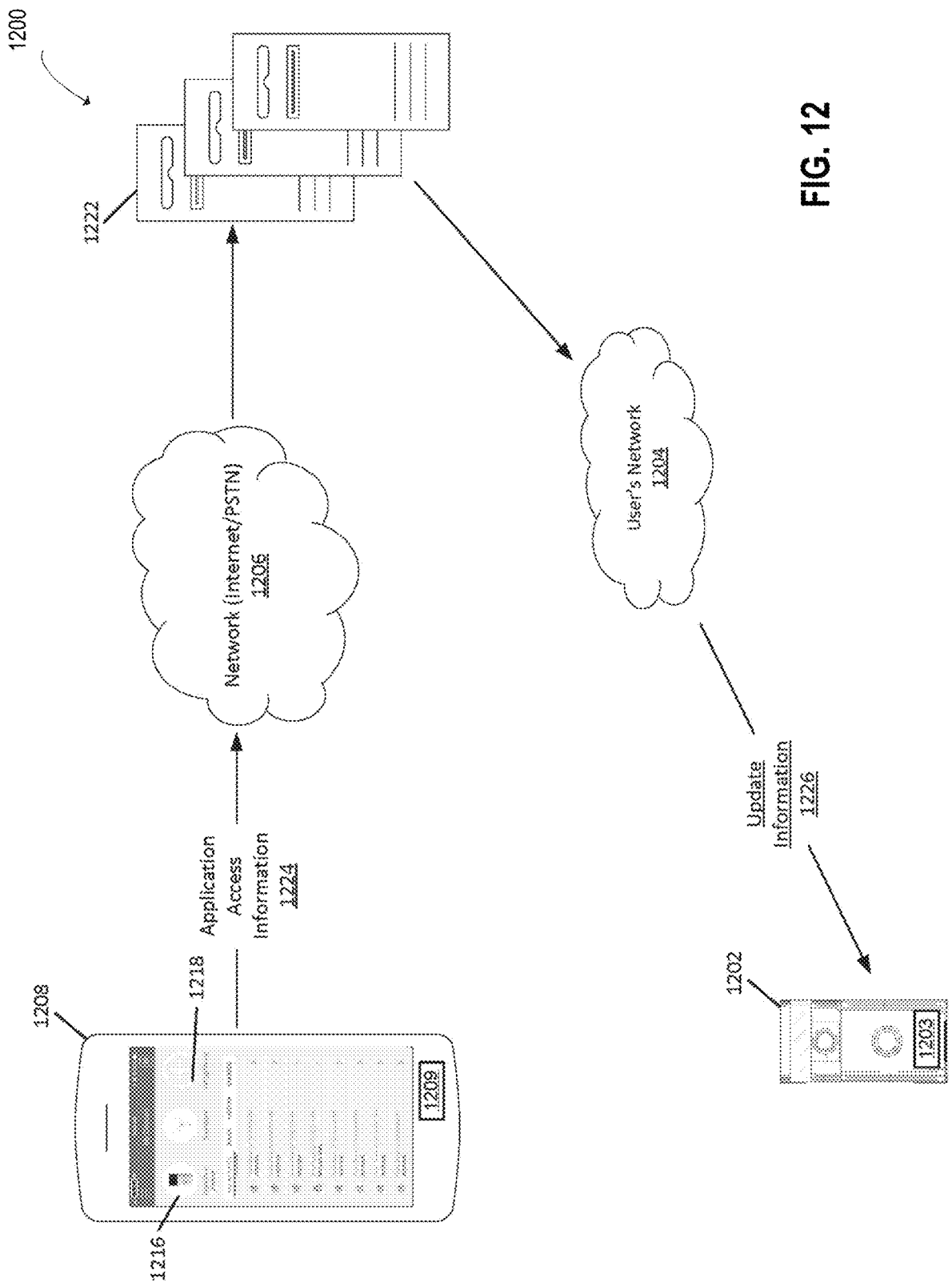
FIG. 12 is a functional block diagram illustrating an embodiment of a system for modifying settings of an A/V device based at least in part on application access according to various aspects of the present disclosure.

FIG. 12 illustrates an environment 1200 in which a server 1222 transmits update information to an A/V device 1202 based at least in part on obtaining application access information 1224 from a client device 1208 in accordance with an embodiment. As illustrated in FIG. 12, the client device 1208 may include an application 1209 that provides a graphical user interface (GUI) 1218 through which the user may interact with the A/V device 1202. As described above, the application 1209 may be maintained in memory of the client device 1208. The GUI 1218, as illustrated in FIG. 12, provides access to a variety of features of the A/V device 1202 as described in the present disclosure. In one example, the GUI 1218 allows the user to view audio/video data obtained from the A/V device 1202 by the server 1222.

The GUI 1218, in various embodiments, is displayed by the client device as a result of the application 1209 being running and open as a result of a user input to the client device. In an example, the user selects an icon representing the application 1209 through a user interface (e.g., touchscreen) of the client device. As a result of the user selecting the icon, the client device may load executable instructions of the application 1209 into memory, or otherwise cause an instance of the application 1209 to be executed (e.g., resumed from a sleeping state, initiated, etc.). In another example, the application 1209 may be executed by a thread of the client device processor(s), provided a certain amount of processor cycles while the application 1209 is being executed in the background, and, when the user selects the icon associated with the application 1209, the number of processor cycles allocated to the application 1209 is increased (e.g., a background thread and/or main thread of the processor). In addition, the application 1209 may be executed, at least during an interval of time, as a background application, for example, executed as a process or thread of the processor(s) of the client device but not displayed in a GUI or other display of the client device. In one example, the application 1209 is suspended (e.g., placed in a suspended state by an operating system executed by the client device) such that at least a portion of the application 1209 remains in memory, but the power consumption and/or processor consumption of the application is reduced. In addition, a suspended state of the application 1209 may also be considered paused for the purposes of the present disclosure. Furthermore, the application 1209 may be resumed from a suspended and/or paused state and returned to an active sate (e.g., additional computing resources are provided to the application). Furthermore, as discussed in the present disclosure selection of a user interface element includes a variety of different operations and/or actions performed by the user when interacting with the client device 1208. For example, selection of the user interface element may include gesture commands, voice commands, or other interactions with the GUI 1218 of the client device 1208 in addition to or as an alternative to selecting icons displayed on a touch screen or similar input device of the client device 1208.

The client device 1208 and servers 1222 may communicate over a network (Internet/PSTN) 1206. In some embodiments, the client device 1208 may be configured to connect directly to the network (Internet/PSTN) 1206, such as over a cellular connection. As shown in FIG. 12, the A/V device 1202 may communicate with the server 1222 over the user's network 1204, which may include the user network 110 described above in connection with FIG. 1. Although FIG. 12 shows the client device 1208 communicating with the servers 1222 over the network (Internet/PSTN) 1206 and the A/V device 1202 over the user's network 1204, communication over other networks or the same network (e.g., both the client device 1208 and the A/V device 1202 communicating over the user's network 1204) are considered within the scope of the present disclosure. Other networks, such as Bluetooth networks and mesh networks, are also considered within the scope of the present disclosure.

The GUI 1218, in various embodiments, is displayed on the client device 1208 as a result of user input provided to an input device of the client device 1208, such as a touchscreen. As illustrated in FIG. 12, the GUI 1218 may contain a plurality of user interface elements, including a first user interface element 1216 representing the A/V device 1202. In some embodiments, the first user interface element 1216 enables the user to interact with the A/V device 1202, for example, streaming audio/video data captured by the A/V device 1202, modifying settings of the A/V device 1202, obtaining device information associated with the A/V device 1202, or otherwise interacting with the A/V device 1202. In addition, the first user interface element 1216 may guide or otherwise direct the user through a set of menus and/or processes for interacting with the A/V device 1202. In one example, the selection of the first user interface element 1216 causes the GUI 1218 to display a set of user interface elements corresponding to different interactions the user may perform.

As a result of the user interacting with the first user interface element 1216 and/or other user interface elements of the GUI 1218, application access information 1224 may be transmitted to the server 1222. In one example, the application access information 1224 is transmitted as a result of the application 1209 launching and causing the GUI 1218 to be displayed. In other examples, the application access information 1224 is transmitted as a result of the user interacting with the first user interface element 1216, a set of user interface elements, and/or an ordered set of user interface elements (e.g., particular user interface elements in a certain order). Furthermore, in various embodiments, the application access information 1224 is generated in response to user input (e.g., the user interacting with certain user interface elements) and transmitted along with requests, commands, application programming interface (API) calls, and/or other information communicated with the server 1222. In certain embodiments, the application access information 1224 is determined by the server 1222 in response to communications obtained from the client device 1208. For example, as a result of the user selecting the first user interface element 1216, the client device 1208 may transmit an API call for device health information associated with the A/V device 1202. Upon receiving the API call for device health information, the server 1222 may determine the application access information 1224 based at least in part on receiving the API call for device health information.

In certain embodiments, the application access information 1224 is transmitted without any additional data, request, API call, command, or other information to the server 1222. Once the server 1222 obtains the application access information 1224, the server 1222, in some embodiments, determines update information 1226 to transmit to the A/V device 1202. In an example, the application access information 1224 indicates at least part of the update information 1226 to provide to the A/V device 1202. In yet another example, receipt of the application access information 1224 by the server 1222 is sufficient for the server 1222 to transmit the update information 1226 to the A/V device 1202. In some embodiments, the server 1222 may generate the update information 1226 based at least in part on the application access information 1224. For example, when the application access information 1224 indicates that the user has launched the application 1209, the server 1222 may generate the update information 1226 such that once the update information 1226 is obtained by the A/V device 1202, the A/V device 1202 sets the keep-alive interval 1203 to five seconds. In another example, when the application access information 1224 indicates that the user has selected the first user interface element 1216, the server 1222 may generate the update information 1226 such that once the update information 1226 is obtained by the A/V device 1202, the A/V device 1202 sets the keep-alive interval 1203 to one second. In this manner, different update information 1226 may be generated and/or provided to the A/V device 1202 in response to different application access information 1224 (e.g., different user interactions with the application 1209).

Figure 13:
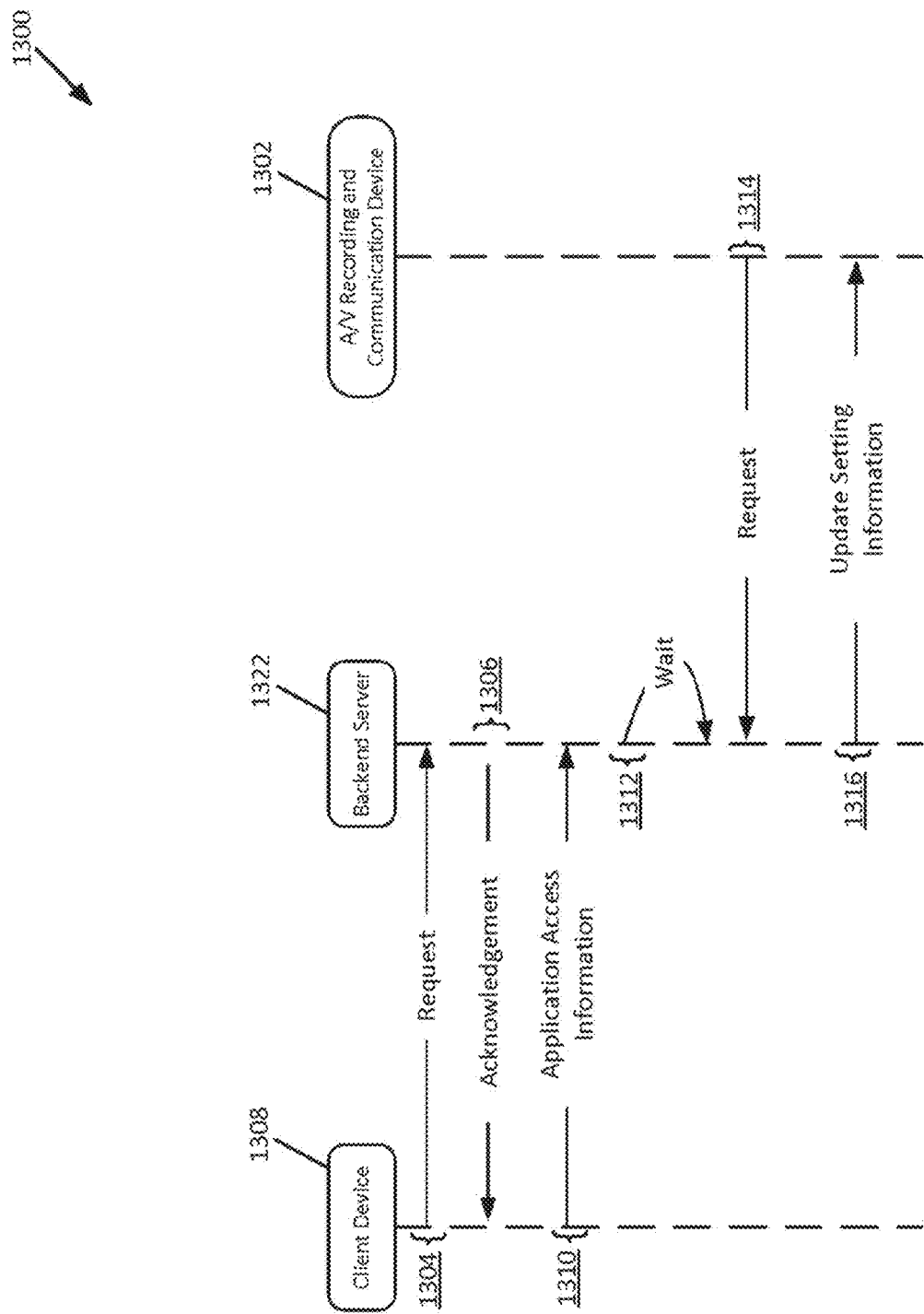
FIGS. 13 and 14 are messaging diagrams illustrating embodiments of systems and processes for modifying settings of an A/V device based at least in part on application access according to various aspects of the present disclosure.

FIG. 13 shows a messaging diagram illustrating a process 1300 for updating a setting of an A/V device 1302 based at least in part on interactions with an application (e.g., application 1209) executed by a client device 1308 in accordance with an embodiment. The client device 1308 and the A/V device 1302 may include a variety of different devices including those described above, such as the client devices 1108, 1110 and the A/V devices 1102, respectively, described in connection with FIG. 11. Furthermore, the client device 1308 and the A/V device 1302 may communicate through a server 1322, as illustrated in FIG. 13. The server 1322 may include a variety of different systems and/or services, such as the network of servers/backend devices 1118 described above in connection with FIG. 11.

The process 1300 includes the client device 1308 transmitting a request 1304 to the server 1322. The request 1304, in various embodiments, is generated by the client device 1308 as a result of a user providing an input to the client device 1308 using an input device. In one example, the request 1304 is a request to establish a connection with the server 1322. In response to the request 1304, the server 1322 may transmit an acknowledgement 1306 to the client device 1302. In various embodiments, the acknowledgement 1306 is used by the client device 1308 to establish a connection with the server 1322 or to otherwise transmit information to the server 1322. Once a connection is established, the client device 1308 may transmit application access information 1310. The application access information 1310, in some embodiments, is included in the request 1304 as part of establishing a connection with the server 1322. In numerous variations of the process 1300, the client device 1308 may transmit the application access information 1310 without transmitting the request 1304 and/or receiving the acknowledgment 1306.

In various embodiments, the application access information 1310 is used by the server 1322 to determine a state of the application executed by the client device 1308 and/or one or more user interactions with the application. In one example, the application access information 1310 indicates a navigational screen and/or GUI displayed to the user of the client device 1308. In another example, the application access information 1310 indicates operations performed by the user using the application. Once the application access information 1310 is obtained by the server 1322, the server 1322 may determine updated settings to be applied by the A/V device 1302. For example, the setting may modify a keep-alive interval used by the A/V device 1302.

The server 1322 may then wait 1312 until a request 1314 (e.g., a signal) is received from the A/V device 1302. As described above, the request 1314 may be transmitted as a result of a check-in procedure implemented within the A/V device 1302. In various embodiments, at the termination of the keep-alive interval the processor of the A/V device 1302 switches from a low-power state to an active state and, as a result, transmits the request 1314 to the server 1322. The request 1314 may be a check-in request to enable the A/V device 1302 to determine whether the server 1322 has an update, a command, a request, or any other information to be provided to the A/V device 1302.

In response to the request 1314, the server 1322, in an embodiment, transmits the update setting information 1316 to the A/V device 1302. The update setting information 1316 may include the modified keep-alive interval as described above, or may otherwise modify the operation of the A/V device to reduce latency and enhance response time. In various embodiments, the A/V device 1302 transmits information indicating that the setting(s) has/have been updated, as indicated by the update setting information 1316. Should the A/V device 1302 fail to update the setting(s) as indicated by the update setting information 1316, an indication may be transmitted to the server 1322, and the server 1322 may be configured to resend or otherwise retry to update the setting(s) of the A/V device 1302. In some embodiments, failure to obtain an acknowledgment or other indication from the A/V device 1302 automatically causes the server 1322 to resend the update setting information 1316. If no response is received after a certain number of retries, the server 1322 may determine that the A/V device 1302 is unreachable and/or that another error is preventing the A/V device 1302 from modifying the setting, and the process 1300 may terminate.

Figure 14:
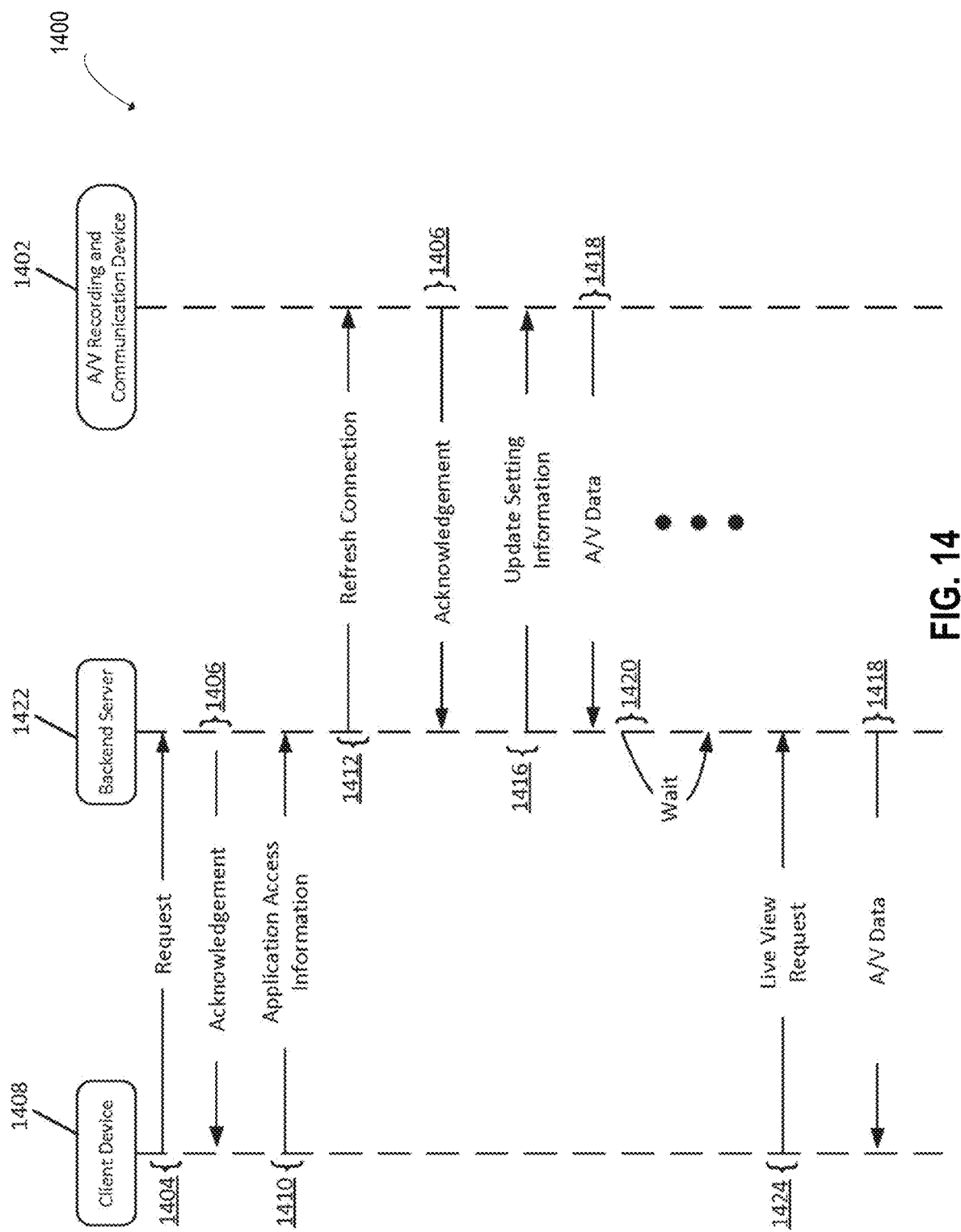

FIG. 14 shows a messaging diagram illustrating a process 1400 for updating a setting of an A/V device 1402 based at least in part on interactions with an application executed by a client device 1408 in accordance with an embodiment. The client device 1408 and the A/V device 1402 may include a variety of different devices, such as the client devices 1108, 1110 and the A/V devices 1102, respectively, described in connection with FIG. 11. Furthermore, the client device 1408 and the A/V device 1402 may communicate through a server 1422, as illustrated in FIG. 14. The server 1422 may include a variety of different systems and/or services, such as the network of servers/backend devices 1118 described above in connection with FIG. 11.

In an embodiment, the request 1404 is transmitted from the client device 1408 to the server 1422. The request 1404 may include a variety of different requests described in the present disclosure, for example, the request 1304 as described above in connection with FIG. 13. In numerous variations of the process 1400, the request 1404 may include the application access information 1410. In one example, the request 1404 includes an API call to the server 1422 and the server 1422, based at least in part on information included in the API call, determines the application access information 1410. The server 1422 may transmit an acknowledgement 1406 in response to communications from the client device 1408. In variations of the process 1400, the server 1422 may transmit a response to the request 1404 and/or the acknowledgment 1406 may include the response to the request 1404. The request 1404, the acknowledgement 1406, and the application access information 1410 may be similar to those described above in connection with FIG. 13.

In response to the application access information 1410, the server 1422 may attempt to refresh the connection 1412 with the A/V device 1402, when the connection has expired, for example. In various embodiments, the server 1422 may use a socket connection or similar connection to exchange information and/or otherwise communicate with the A/V device 1402. In such embodiments, the connection may need to be refreshed periodically or aperiodically to enable communication over the connection. In certain embodiments, the connection does not need to be refreshed, and the server 1422 may transmit the update setting information 1416 without the need to refresh the connection 1412. However, when the connection requires repair or to otherwise be refreshed, the A/V device 1402 may transmit a request to establish a socket connection to the server 1422. In an embodiment, the A/V device transmits an acknowledgement 1406 to the server 1422 to establish and/or refresh the connection (e.g., the socket connection). In an example, the server 1422 and the A/V device 1402, during an initialization procedure or similar process, establish a network address and port for communications. The refresh connection 1412, in such an example, may be a request to determine if the A/V device 1402 is still capable of receiving communications at the network address and port established during the initialization procedure. Furthermore, in such an example, the acknowledgement 1406 may indicate to the server 1422 that the A/V device 1402 is capable of receiving communication at the network address and port established during the initialization procedure.

In response, the server 1422 may transmit update setting information 1416 to the A/V device 1402. The update setting information 1416 may include any modification to the operation and/or settings of the A/V device described in the present disclosure.

In some embodiments, the A/V device 1402 may transmit A/V data 1418 to the sever 1422. In one example, the A/V data 1418 is transmitted to the server 1422 based at least in part on the update setting information 1416. In one example, the application access information 1410 indicates the user is interacting with a GUI associated with the A/V device 1402. As a result, the update setting information 1416 generated by the server 1422 causes the A/V device 1402 to stream A/V data 1418 to the server 1422 in anticipation of the client device 1408 requesting the A/V data 1418. In certain embodiments, the A/V data 1418 may include information about a status of the A/V device 1402. For example, the A/V data 1418 may indicate that a processor of the A/V device 1402 has transitioned from a low-power state to an active state. In another example, the A/V data 1418 includes device information of the A/V device 1402, such as battery level, Wi-Fi signal strength, firmware version, software version, hardware component status, results of one or more tests, and/or other information indicating the health and/or status of the A/V device 1402.

In some embodiments, the A/V device 1402 may stream the A/V data 1418 to the server 1422. In an example, the A/V device 1402 streams audio and video data (e.g., the A/V data 1418) to the server 1422. The server 1422 may receive the A/V data 1418 and wait 1420 for a live view request 1424 from the client device. As described in the present disclosure, the live view request 1424 may be a request to obtain audio and/or video data captured by the A/V device 1402. The audio and/or video data may be obtained by the server 1422 from the A/V device 1402 and streamed to the client device 1408 as described in U.S. patent application Ser. No. 15/380,403, entitled "VIDEO ON DEMAND FOR AUDIO/ VIDEO RECORDING AND COMMUNICATION DEVICES," filed on Dec. 15, 2016, the entire contents of which are hereby incorporated by reference as if fully set forth. Furthermore, the A/V device 1402, in various embodiments, may continue to provide A/V data 1418 for an interval of time and/or until the server 1422 and/or the client device 1408 indicates to stop.

The server 1422, in response to the live view request 1424, may transmit the A/V data 1418 to the client device 1408. The A/V data 1418 (e.g., the video data captured by a camera of the A/V device 1402) may be transmitted starting from various points in time. For example, in response to the live view request 1424, the server 1422 may transmit the A/V data 418 starting from the point in time the live view request 1424 was received, or may transmit the A/V data 1418 from the point in time when the A/V device 1402 began transmitting the A/V data 1418. In numerous variations of the process 1400, the live view request 1424 causes the server 1422 to transmit a request to the A/V device 1402 to transmit audio and/or video data, which is then streamed or otherwise provided to the client device 1408 as described in the present disclosure.

Figure 15:
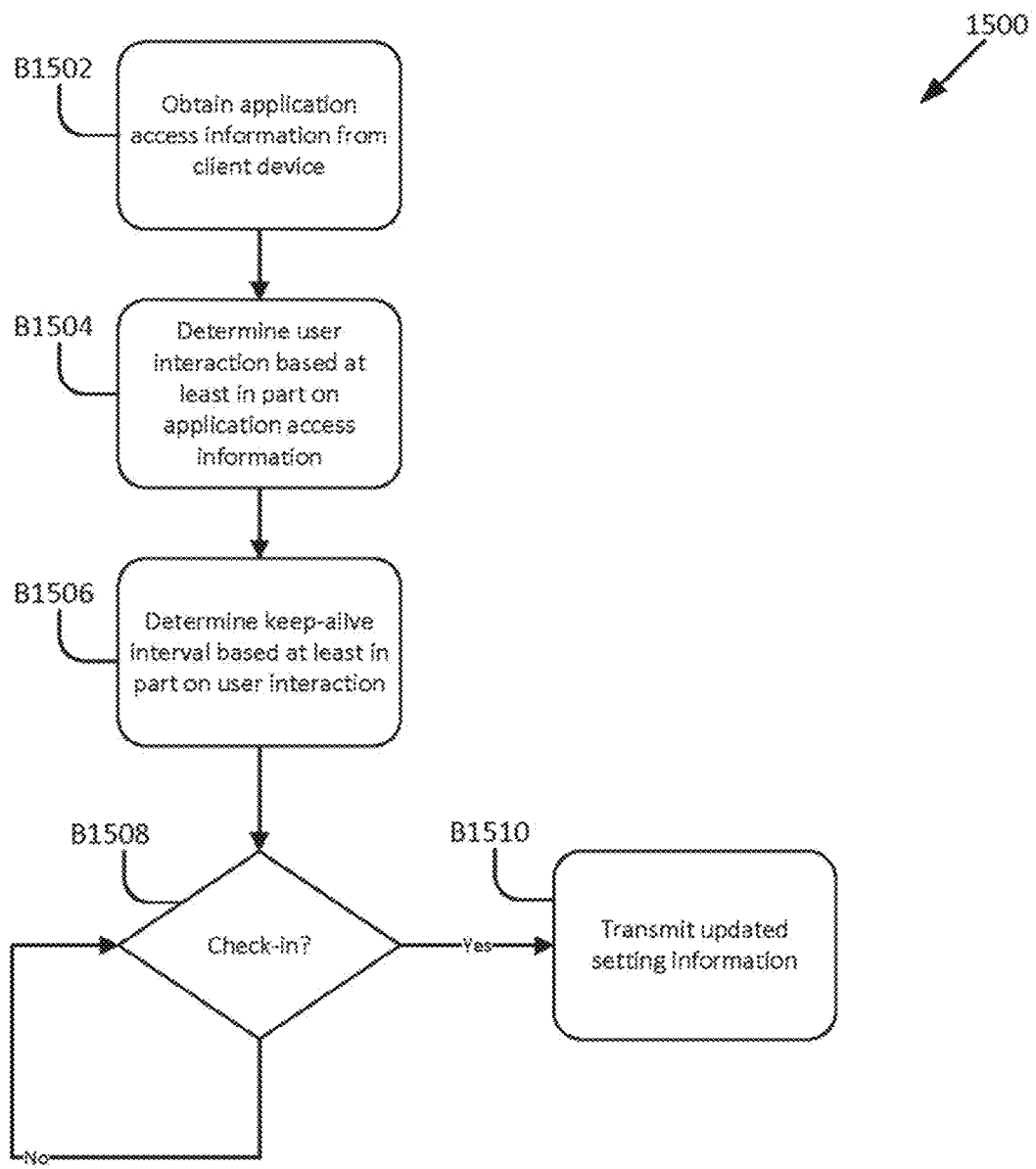
FIGS. 15-17 are flow charts illustrating embodiments of example processes for modifying settings of an A/V device based at least in part on application access according to various aspects of the present disclosure.

FIG. 15 shows an example process 1500 for updating a setting of an A/V device by a server in accordance with an embodiment. The process 1500 includes a set of operations that may be performed by any computing device and/or system described in the present disclosure, for example, the server 1122 described above in connection with FIG. 11. Furthermore, the server may include memory that stores instructions that, when executed by one or more processors of the server, cause the server to execute the process 1500. At block B1502, the server obtains application access information from the client device. The client device, in various embodiments, includes an application to enable the client device, through the sever, to access various features of the A/V device. Furthermore, as described in the present disclosure, the application may cause the client device to transmit application access information indicating a state of the application and/or user interaction with the application to the server.

At block B1504, the server may determine a user interaction based at least in part on the application access information. For example, the server may determine if the user has navigated to a portion of a GUI of the application from which the customer can access a particular feature (e.g., live view) of the A/V device. The user interaction may indicate a likelihood that the user will access one or more features of the A/V device. Furthermore, the interaction may determine whether the user will access a feature of the A/V device for which the user may experience latency as a result of having to wait for the A/V device to transition from a low-power state to an active state. In an example, when the user selects a user interface element associated with the A/V device, the application access information transmitted to the server may indicate that the user has navigated to a portion of the application from which the live view feature of the A/V device can be accessed.

At block B1506, the server may determine a keep-alive interval based at least in part on the type of user interaction. In an example, when the user has navigated to a portion of the application associated with the A/V device, the server determines a shorter keep-alive interval to reduce any latency in processing user requests for A/V data from the A/V device. In another example, when the user navigates to a portion of the application that requires a plurality of user inputs to request live view, the server determines a longer keep-alive interval to reduce load on a battery of the A/V device (e.g., in embodiments in which the A/V device is battery powered).

At block B1508, the server determines if the A/V device has checked-in. As described in the present disclosure, the A/V device may transition from a low-power state to an active state and perform a check-in operation. The server, in various embodiments, waits until the A/V device checks-in. When the A/V device checks-in, the server proceeds to block B1510 and transmits updated setting information to the A/V device. In an example, the server transmits the keep-alive interval determined in block B1506. In various embodiments, the server may queue or otherwise maintain commands and/or other information directed to the A/V device until the check-in at block B1508 is received. Furthermore, as described in the present disclosure, the updated setting information may include information that, once received by the A/V device, causes the A/V device to modify one or more operations and/or functions of the A/V device. The operations of the process 1500 may be performed in various orders including in serial and/or parallel. In addition, one or more operations of the process 1500 may be omitted in various embodiments. For example, the server may determine the keep-alive interval based at least in part on the application access information without the need to determine user interaction based at least in part on the application access information.

Figure 16:
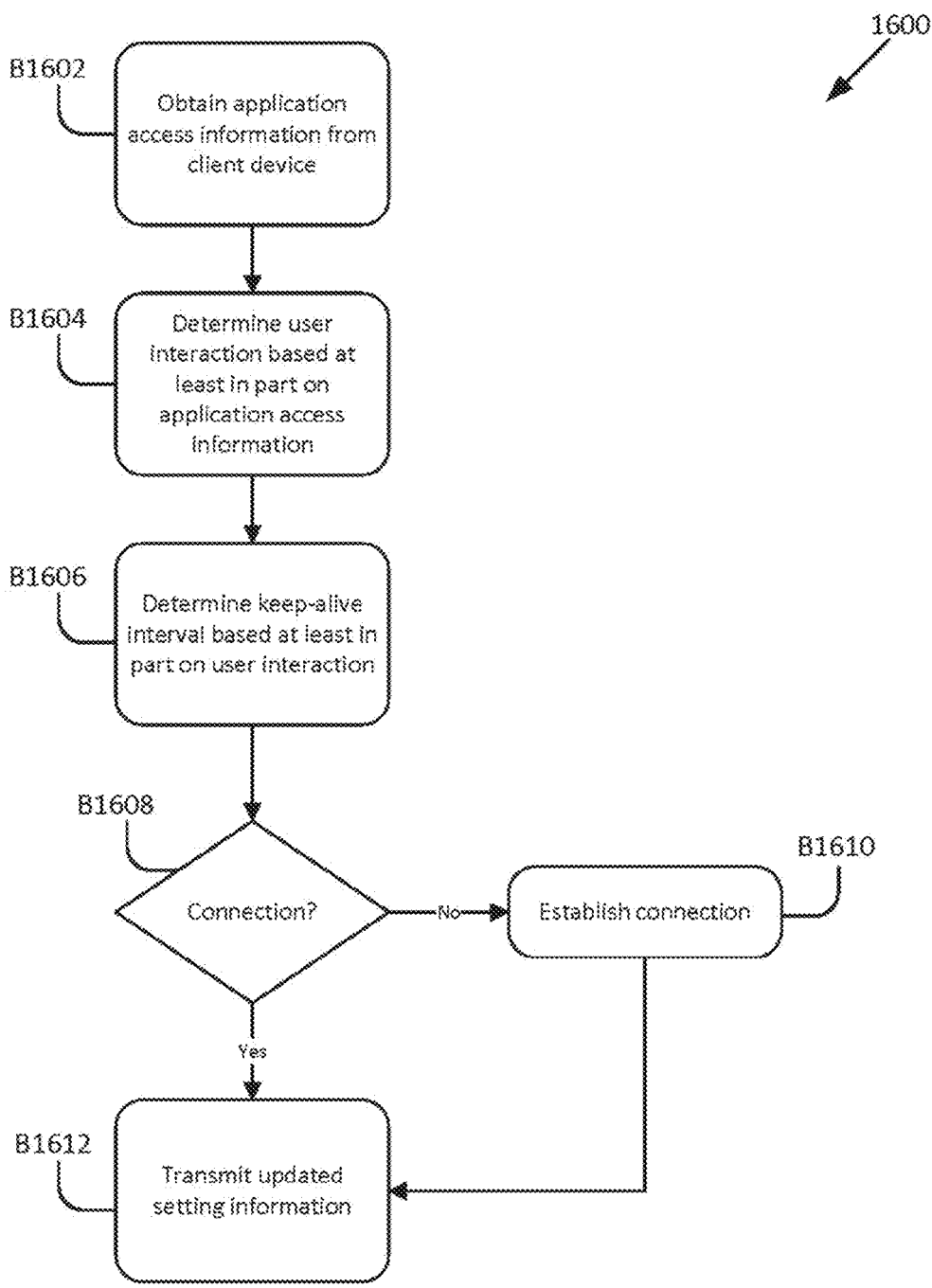

FIG. 16 shows an example process 1600 for updating a setting of an A/V device by a server in accordance with an embodiment. The process 1600 includes a set of operations that may be performed by any computing device and/or system described in the present disclosure, for example, the server 1122 described above in connection with FIG. 11. Furthermore, the server may include memory that stores instructions that, when executed by one or more processors of the server, cause the server to execute the process 1600. At block B1602, the server obtains application access information from the client device. The client device, in various embodiments, includes an application to enable the client device, through the sever, to access various features of the A/V device. Furthermore, as described in the present disclosure, the application may cause the client device to transmit application access information indicating a state of the application and/or user interaction with the application to the server.

At block B1604, the server may determine user interaction based at least in part on the application access information, similar to the operation 1504 described above in connection with FIG. 15. As described in the present disclosure, the application access information may be generated, by the client device, in addition to requests, API calls, and/or other information transmitted to the server as a result of the user interacting with the application. In certain embodiments, the application access information is derived from the server based at least in part on the requests, the API calls, and/or other information obtained from the client device. In an example, the server determines the user selected a particular user interface element based at least in part on receiving an API call associated with the particular user interface element from the client device.

At block B1606, the server may determine a keep-alive interval based at least in part on the user interaction and/or application access information. As described in the present disclosure, the server may determine a shorter keep-alive interval is to be provided to the A/V device to reduce latency experienced by the user when interaction with particular features of the application (e.g., live view, health check, management operations, etc.) is indicated in the application access information. At block B1608, the server determines if a connection with the A/V device is present. In a first example, the server determines if a socket connection with the A/V device needs to be refreshed. In a second example, the server determines whether a connection with the A/V device is to be established. In block B1610, when no connection and/or no active connection is detected, the server establishes and/or re-establishes the connection with the A/V device. For example, the server may communicate with the A/V device to establish a socket connection.

At block B1612, when a connection is active with the A/V device, the server may transmit updated settings information. Furthermore, as described in the present disclosure, the updated setting information may include information that, once received by the A/V device, causes the A/V device to modify one or more operations and/or functions of the A/V device. The operations of the process 1600 may be performed in various orders including in serial and/or parallel. In addition, one or more operations of the process 1600 may be omitted in various embodiments. For example, the server may determine the keep-alive interval based at least in part on the application access information without the need to determine user interaction based at least in part on the application access information.

Figure 17:
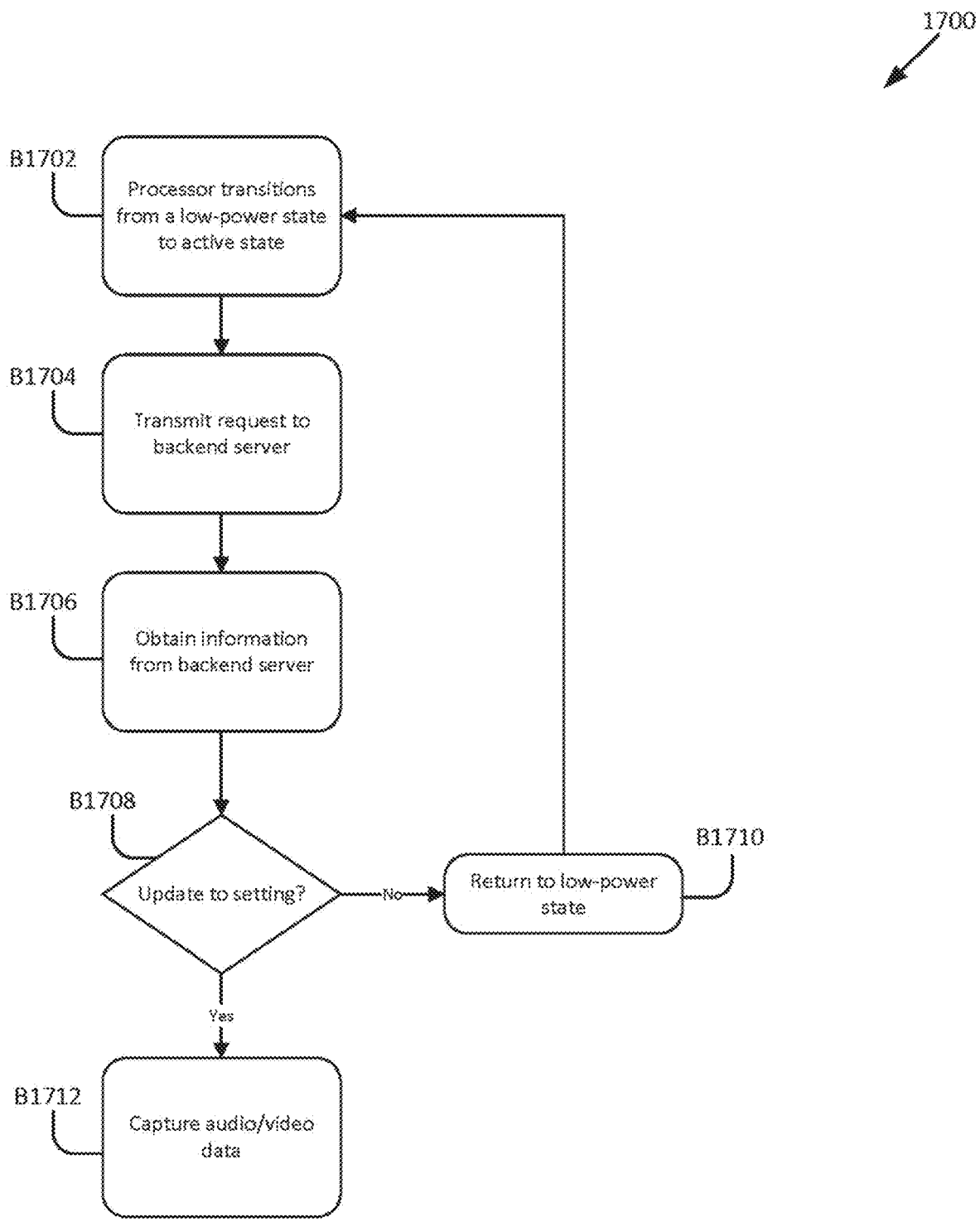

FIG. 17 shows an example process 1700 for obtaining an update to a setting of an A/V device from a server in accordance with an embodiment. The process 1700 includes a set of operations that may be performed by any computing device and/or system described in the present disclosure, for example, the A/V devices 1102 described above in connection with FIG. 11. Furthermore, the A/V device may include memory that stores instructions that, when executed by one or more processors of the A/V device, cause the A/V device to execute the process 1700. At block B1702, the processor of the A/V device transitions from a low-power state to an active state. As described in the present disclosure, the A/V device may be configured to maintain the processor in a low-power state for an interval of time to reduce the load on a battery or other power supply of the A/V device.

At block B1704, the A/V device transmits a request to the server. In various embodiments, the A/V device transmits a check-in request to the server after transitioning from the low-power state to the active state. Furthermore, the request may be transmitted to determine whether the server has any information, requests, commands, API calls, and/or other data to provide to the A/V device. At block B1706, the A/V device obtains information from the server. As described in the present disclosure, the server may enqueue information to be transmitted to the A/V device and wait for a request from the A/V device to transmit the information to the A/V device.

At block B1708, the A/V device determines if the information obtained at block B1706 includes an update to a setting of the A/V device. In one example, the server may transmit information indicating that there is no update, request, command, API call, or other information for the A/V device. In such examples, at block B1710, the A/V device may return to the low-power state. The A/V device, as described in the present disclosure, may maintain the low-power state for an interval of time before returning to block B1702.

At block B1708, when the information obtained at block B1706 includes an update to the setting, the A/V device may update the setting (e.g., modify the keep-alive interval) and, at block B1712, capture audio/video data. In various embodiments, the A/V device captures audio/video data in anticipation of a user requesting the audio/video data. For example, the A/V device may, based at least in part on the updated setting and/or information obtained from the server, capture audio/video data until a command is received from the server to stop capturing the audio/video data and return to a low-power state. In other examples, the A/V device may, based at least in part on the updated setting and/or information obtained from the server, stay in the active state until a command is received from the server to return to a low-power state.

In numerous variations of the process 1700, the A/V device does not capture audio/video data. In such variations, the A/V device may update the keep-alive interval based at least in part on the update to the setting and continue to block B1710 until the termination of the keep-alive interval. Furthermore, the operations of process 1700 may be performed in various orders including in serial and/or parallel.

Figure 18:
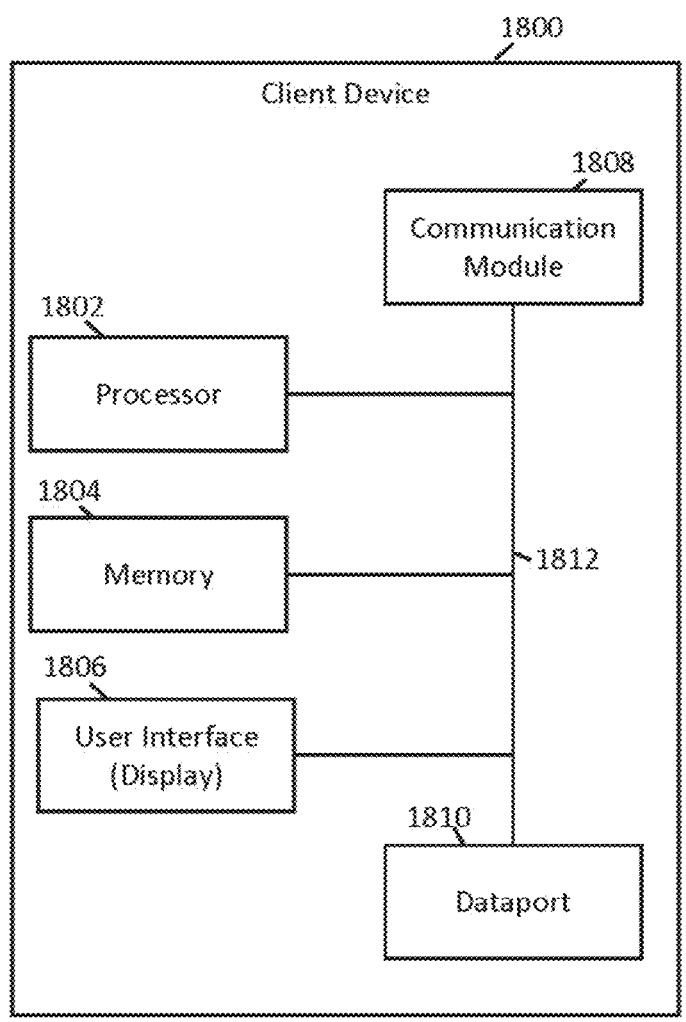
FIG. 18 is a functional block diagram of a client device on which the present embodiments may be implemented according to various aspects of the present disclosure.

FIG. 18 is a functional block diagram of a client device 1800 on which the present embodiments may be implemented according to various aspects of the present disclosure. The user's client device 114 described with reference to FIG. 1 may include some or all of the components and/or functionality of the client device 1800. The client device 1800 may comprise, for example, one or more of a smartphone, a tablet computer, a laptop computer, and a desktop computer.

With reference to FIG. 18, the client device 1800 includes a processor 1802, a memory 1804, a user interface 1806, a communication module 1808, and a dataport 1810. These components are communicatively coupled together by an interconnect bus 1812. The processor 1802 may include any processor used in smartphones and/or portable computing devices, such as an ARM processor (a processor based on the RISC (reduced instruction set computer) architecture developed by Advanced RISC Machines (ARM)). In some embodiments, the processor 1802 may include one or more other processors, such as one or more conventional microprocessors, and/or one or more supplementary co-processors, such as math co-processors.

The memory 1804 may include both operating memory, such as random access memory (RAM), as well as data storage, such as read-only memory (ROM), hard drives, flash memory, or any other suitable memory/storage element. The memory 1804 may include removable memory elements, such as a CompactFlash card, a MultiMediaCard (MMC), and/or a Secure Digital (SD) card. In some embodiments, the memory 1804 may comprise a combination of magnetic, optical, and/or semiconductor memory, and may include, for example, RAM, ROM, flash drive, and/or a hard disk or drive. The processor 1802 and the memory 1804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1802 may be connected to the memory 1804 via the dataport 1810.

The user interface 1806 may include any user interface or presentation elements suitable for a smartphone and/or a portable computing device, such as a keypad, a display screen, a touchscreen, a microphone, and a speaker. The communication module 1808 is configured to handle communication links between the client device 1800 and other, external devices or receivers, and to route incoming/outgoing data appropriately. For example, inbound data from the dataport 1810 may be routed through the communication module 1808 before being directed to the processor 1802, and outbound data from the processor 1802 may be routed through the communication module 1808 before being directed to the dataport 1810. The communication module 1808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1810 may be any type of connector used for physically interfacing with a smartphone and/or a portable computing device, such as a mini-USB port or an IPHONE®/IPOD® 30-pin connector or LIGHTNING® connector. In certain embodiments, the dataport 1810 may include multiple communication channels for simultaneous communication with, for example, other processors, servers, and/or client terminals.

The memory 1804 may store instructions for communicating with other systems, such as a computer. The memory 1804 may store, for example, a program (e.g., computer program code) adapted to direct the processor 1802 in accordance with the present embodiments. The instructions also may include program elements, such as an operating system. While execution of sequences of instructions in the program causes the processor 1802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 19:
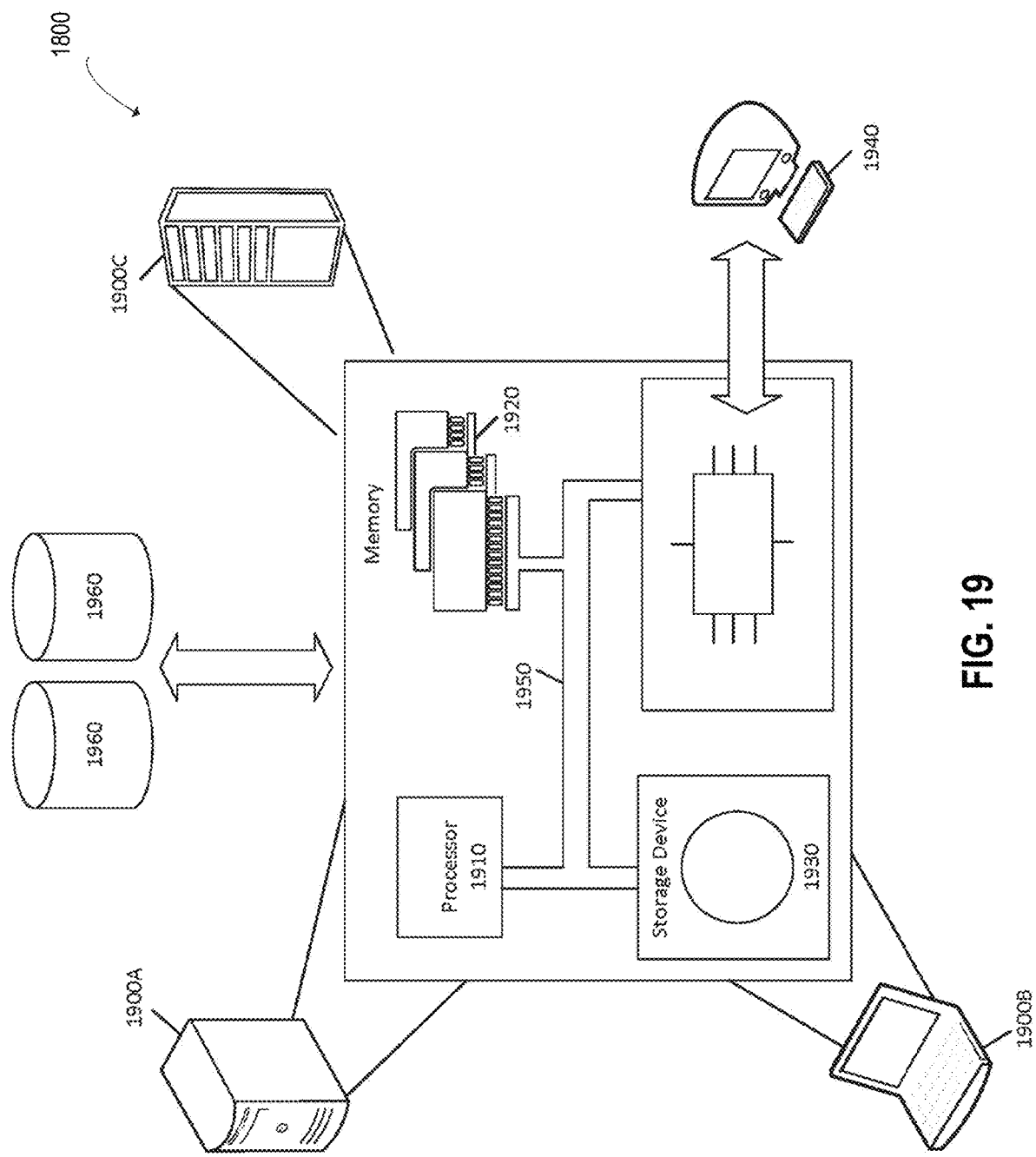
FIG. 19 is a functional block diagram of a general-purpose computing system on which the present embodiments may be implemented according to various aspects of present disclosure.

FIG. 19 is a functional block diagram of a general-purpose computing system on which the present embodiments may be implemented according to various aspects of the present disclosure. The computer system 1900 may be embodied in at least one of a personal computer (also referred to as a desktop computer) 1900A, a portable computer (also referred to as a laptop or notebook computer) 1900B, and/or a server 1900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1900 may execute at least some of the operations described above. The computer system 1900 may include at least one processor 1910, memory 1920, at least one storage device 1930, and input/output (I/O) devices 1940. Some or all of the components 1910, 1920, 1930, 1940 may be interconnected via a system bus 1950. The processor 1910 may be single- or multi-threaded and may have one or more cores. The processor 1910 may execute instructions, such as those stored in the memory 1920 and/or in the storage device 1930. Information may be received and output using one or more I/O devices 1940.

The memory 1920 may store information, and may be a computer-readable medium, such as volatile or non-volatile memory. The storage device(s) 1930 may provide storage for the system 1900, and may be a computer-readable medium. In various aspects, the storage device(s) 1930 may be a flash memory device, a hard disk device, an optical disk device, a tape device, or any other type of storage device.

The I/O devices 1940 may provide input/output operations for the system 1900. The I/O devices 1940 may include a keyboard, a pointing device, and/or a microphone. The I/O devices 1940 may further include a display unit for displaying graphical user interfaces, a speaker, and/or a printer. External data may be stored in one or more accessible external databases 1960.

In a first aspect, a method communicates among a client device, a network device, and an audio/video (A/V) recording and communication device (A/V device). The network device includes a processor, memory, and instructions that when executed by the processor implement the method. An indication is received from the client device that an application associated with the A/V device is running and open on a display of the client device. Update information is generated that, when received by the A/V device, causes the A/V device to adjust a keep-alive interval of the A/V device from a first amount of time to a second amount of time shorter than the first amount of time. A signal from the A/V device is received and the update information is transmitted to the A/V device in response to receiving the signal from the A/V device.

In certain embodiments of the first aspect, the application enables the client device to communicate with the A/V device.

In certain embodiments of the first aspect, the signal comprises a check-in request generated by the A/V device when transitioning from a low-power state to an active state.

In certain embodiments of the first aspect, the network device comprises a server that enables communication between the client device and the A/V device.

In certain embodiments of the first aspect, the second amount of time comprises a number of seconds determined based at least in part on the indication.

In certain embodiments of the first aspect, the indication comprises application access information generated by the client device as a result of a user input.

In certain embodiments of the first aspect, the application access information indicates user selection of a particular user interface element of the application.

In certain embodiments of the first aspect, the application access information indicates user interaction with a particular user interface element of the application.

Certain embodiments of the first aspect further comprise generating the update information to cause the A/V device to capture audio data and video data, and send the audio data and the video data to the network device.

Certain embodiments of the first aspect further comprise generating the update information to cause the A/V device to transmit health check information to the network device.

Certain embodiments of the first aspect further comprise causing the A/V device to transmit an image captured by a camera of the A/V device in response to a command received from the client device.

Certain embodiments of the first aspect further comprise generating the update information to cause at least part of the image to be displayed on at least a portion of the display of the client device.

In a second aspect, a method communicates among a client device, an audio/video (A/V) recording and communication device (A/V device), and a network device. The network device includes a processor, memory, and instructions that when executed by the processor implement the method. A signal is received from an application executed by the client device, where the application enables the client device to communicate with the A/V device. In response to the signal, update information is generated that, when received by the A/V device, causes the A/V device to terminate a keep-alive interval associated with a low-power state of the A/V device. The update information is transmitted to the A/V device.

In certain embodiments of the second aspect, the signal indicates user selection of a user interface element associated with a feature of the application.

In certain embodiments of the second aspect, the signal indicates user interaction with a user interface element associated with a feature of the application that switches between a plurality of locations, each having at least one A/V device installed.

Certain embodiments of the second aspect further comprise generating the update information to cause the A/V device to provide, to the network device, data captured by one or more sensor devices of the A/V device when the A/V device processes the update information.

Certain embodiments of the second aspect further comprise generating the update information to cause the A/V device to send health information of the A/V device to the network device.

In a third aspect, a method communicates among a client device, an audio/video (A/V) recording and communication device (A/V device), and a network device. The A/V device includes a processor, memory, and instructions that when executed by the processor implement the method. A request is transmitted to the network device when a keep-alive interval ends. Update information instructing the A/V device to modify a length of the keep-alive interval is received from the network device and the length of the keep-alive interval of the A/V device is modified based upon the update information. The modification to the keep-alive interval of the A/V device is based at least in part on an indication that an application executed by the client device is running and has been displayed on a display of the client device.

In certain embodiments of the third aspect, the request includes health information of the A/V device.

Certain embodiments of the third aspect further comprise capturing A/V data at the A/V device and sending the A/V data to the network device in response to the update information, wherein the update information instructs the A/V device to capture and send the A/V data to the network device.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method for communicating among a client device, a network device, and an audio/video (A/V) recording and communication device (A/V device), the network device including a processor, memory, and instructions that when executed by the processor implement the method, the method comprising:
   receiving an indication from the client device that an application associated with the A/V device is running and open on a display of the client device;
   generating update information that, when received by the A/V device, causes the A/V device to adjust a keep-alive interval of the A/V device from a first amount of time to a second amount of time shorter than the first amount of time;
   receiving a signal from the A/V device; and
   transmitting the update information to the A/V device in response to receiving the signal from the A/V device.

2. The method of claim 1, wherein the application enables the client device to communicate with the A/V device.

3. The method of claim 1, wherein the signal comprises a check-in request generated by the A/V device when transitioning from a low-power state to an active state.

4. The method of claim 1, wherein the network device comprises a server that enables communication between the client device and the A/V device.

5. The method of claim 1, wherein the second amount of time comprises a number of seconds determined based at least in part on the indication.

6. The method of claim 1, wherein the indication comprises application access information generated by the client device as a result of a user input.

7. The method of claim 6, wherein the application access information indicates user selection of a particular user interface element of the application.

8. The method of claim 6, wherein the application access information indicates user interaction with a particular user interface element of the application.

9. The method of claim 1, further comprising generating the update information to cause the A/V device to capture audio data and video data, and send the audio data and the video data to the network device.

10. The method of claim 1, further comprising generating the update information to cause the A/V device to transmit health check information to the network device.

11. The method of claim 1, further comprising causing the A/V device to transmit an image captured by a camera of the A/V device in response to a command received from the client device.

12. The method of claim 11, further comprising causing at least part of the image to be displayed on at least a portion of the display of the client device.

13. A method for communication among a client device, an audio/video (A/V) recording and communication device (A/V device), and a network device, the network device including a processor, memory, and instructions that when executed by the processor implement the method, the method comprising:
   receiving a signal from an application executed by the client device, wherein the application enables the client device to communicate with the A/V device;
   generating, in response to the signal, update information that, when received by the A/V device, causes the A/V device to terminate a keep-alive interval associated with a low-power state of the A/V device; and
   transmitting the update information to the A/V device.

14. The method of claim 13, wherein the signal indicates user selection of a user interface element associated with a feature of the application.

15. The method of claim 13, wherein the signal indicates user interaction with a user interface element associated with a feature of the application that switches between a plurality of locations, each having at least one A/V device installed.

16. The method of claim 13, further comprising generating the update information to cause the A/V device to provide, to the network device, data captured by one or more sensor devices of the A/V device when the A/V device processes the update information.

17. The method of claim 13, further comprising generating the update information to cause the A/V device to send health information of the A/V device to the network device.

18. A method for communication among a client device, an audio/video (A/V) recording and communication device (A/V device), and a network device, the A/V device including a processor, memory, and instructions that when executed by the processor implement the method, the method comprising:
   transmitting a request to the network device when a keep-alive interval ends;
   receiving, from the network device, update information instructing the A/V device to modify a length of the keep-alive interval; and
   modifying the length of the keep-alive interval of the A/V device based upon the update information;
   wherein the modification to the keep-alive interval of the A/V device is based at least in part on an indication that an application executed by the client device is running and has been displayed on a display of the client device.

19. The method of claim 18, wherein the request includes health information of the A/V device.

20. The method of claim 18, further comprising capturing A/V data at the A/V device and sending the A/V data to the network device in response to the update information, wherein the update information instructs the A/V device to capture and send the A/V data to the network device.

21. The method of claim 18, the keep-alive interval defining a frequency at which the A/V device performs a check-in with the network device.

22. The method of claim 1, the keep-alive interval defining a frequency at which the A/V device performs a check-in with the network device.

23. The method of claim 13, the keep-alive interval defining a frequency at which the A/V device performs a check-in with the network device.

* * * * *